US012750135B2

(12) United States Patent
Pickerd et al.

(10) Patent No.: US 12,750,135 B2

(45) **Date of Patent: *Sep. 29, 2026**

(54) SYSTEMS AND METHODS FOR TUNING AND MEASURING A DEVICE UNDER TEST USING MACHINE LEARNING

(71) Applicant: Tektronix, Inc., Beaverton, OR (US)

(72) Inventors: John J. Pickerd, Hillsboro, OR (US); Kan Tan, Portland, OR (US); Evan Douglas Smith, Portland, OR (US); Heike Tritschler, Louisville, CO (US)

( * ) Notice: Subject to any disclaimer, the term of this patent is extended or adjusted under 35 U.S.C. 154(b) by 219 days.

This patent is subject to a terminal disclaimer.

(21) Appl. No.: 18/582,609

(22) Filed: Feb. 20, 2024

(65) Prior Publication Data

US 2024/0235669 A1 Jul. 11, 2024

Related U.S. Application Data

(63) Continuation-in-part of application No. 18/126,342, filed on Mar. 24, 2023, now Pat. No. 12,442,852, and (Continued)

(51) Int. Cl.
*H04B 10/07* (2013.01)
*H04B 10/073* (2013.01)
(Continued)

(52) U.S. Cl.
CPC ..... *H04B 10/0731* (2013.01); *H04B 10/0775* (2013.01); *H04B 10/572* (2013.01);
(Continued)

(58) Field of Classification Search
CPC ............ H04B 10/0731; H04B 10/0775; H04B 10/572; H04B 10/40; H04B 10/07; H04B 10/50
(Continued)

(56) References Cited

U.S. PATENT DOCUMENTS 7,181,146 B1 * 2/2007 Yorks ................. H04B 10/0799 398/25
7,298,463 B2 * 11/2007 French ................... H04B 10/07 356/73.1

(Continued)

*Primary Examiner* — Dibson J Sanchez

(74) *Attorney, Agent, or Firm* — Miller Nash LLP; Andrew J. Harrington

(57) ABSTRACT

A test and measurement system includes a test and measurement instrument, including a port to receive a signal from a device under test (DUT), and one or more processors, configured to execute code that causes the one or more processors to: adjust a set of operating parameters for the DUT to a first set of reference parameters; acquire, using the test and measurement instrument, a waveform from the DUT; repeatedly execute the code to cause the one or more processors to adjust the set of operating parameters and acquire a waveform, for each of a predetermined number of sets of reference parameters; build one or more tensors from the acquired waveforms; send the one or more tensors to a machine learning system to obtain a set of predicted optimal operating parameters; adjust the set of operating parameters for the DUT to the predicted optimal operating parameters; and determine whether the DUT passes a predetermined performance measurement when adjusted to the set of predicted optimal operating parameters.

17 Claims, 27 Drawing Sheets

Related U.S. Application Data a continuation-in-part of application No. 17/876,817, filed on Jul. 29, 2022, now Pat. No. 11,907,090, and a continuation-in-part of application No. 17/877,829, filed on Jul. 29, 2022, now Pat. No. 11,940,889, and a continuation-in-part of application No. 17/701,411, filed on Mar. 22, 2022, now Pat. No. 11,923,896, and a continuation-in-part of application No. 17/701,186, filed on Mar. 22, 2022, now Pat. No. 11,923,895.

(60) Provisional application No. 63/325,373, filed on Mar. 30, 2022, provisional application No. 63/272,998, filed on Oct. 28, 2021, provisional application No. 63/232,378, filed on Aug. 12, 2021, provisional application No. 63/232,580, filed on Aug. 12, 2021, provisional application No. 63/165,698, filed on Mar. 24, 2021.

(51) Int. Cl.
*H04B 10/077* (2013.01)
*H04B 10/572* (2013.01)
*H04B 10/40* (2013.01)
*H04B 10/50* (2013.01)

(52) U.S. Cl.
CPC .............. *H04B 10/07* (2013.01); *H04B 10/40* (2013.01); *H04B 10/50* (2013.01)

(58) Field of Classification Search
USPC ....................... 398/9–38, 135–139, 182–201
See application file for complete search history.

(56) References Cited

U.S. PATENT DOCUMENTS

| | | | | |
|---|---|---|---|---|
| 10,171,161 | B1 * | 1/2019 | Côté | H04B 10/6161 |
| 10,236,982 | B1 * | 3/2019 | Zhuge | H04B 10/073 |
| 10,270,527 | B1 * | 4/2019 | Mentovich | H04B 10/07955 |
| 10,727,973 | B1 * | 7/2020 | Kumar | H04L 45/70 |
| 11,423,303 | B1 * | 8/2022 | Jiao | G06N 3/0442 |
| 11,581,949 | B1 * | 2/2023 | Sanchez | H04B 10/58 |
| 2003/0053170 | A1 * | 3/2003 | Levinson | H04B 10/6911 398/139 |
| 2004/0032889 | A1 * | 2/2004 | Hidaka | H01S 5/0683 372/38.02 |
| 2004/0131365 | A1 * | 7/2004 | Lee | H04B 10/504 398/197 |
| 2004/0136422 | A1 * | 7/2004 | Mahowald | H04B 10/564 372/38.02 |
| 2004/0165622 | A1 * | 8/2004 | Lu | H04B 10/564 372/29.021 |
| 2005/0249252 | A1 * | 11/2005 | Sanchez | H04B 10/564 372/38.07 |
| 2006/0120720 | A1 * | 6/2006 | Hauenschild | H04B 10/564 398/38 |
| 2008/0159737 | A1 * | 7/2008 | Noble | H04B 10/0773 398/16 |
| 2008/0212979 | A1 * | 9/2008 | Ota | H04B 10/572 398/183 |
| 2011/0085793 | A1 * | 4/2011 | Oomori | H04B 10/40 398/43 |
| 2011/0161738 | A1 * | 6/2011 | Zhang | H04B 10/58 714/E11.029 |
| 2014/0093233 | A1 * | 4/2014 | Gao | H04B 10/0799 398/16 |
| 2018/0006721 | A1 * | 1/2018 | Ishizaka | H04B 10/07955 |
| 2019/0318236 | A1 * | 10/2019 | Zou | G06E 3/005 |
| 2020/0133817 | A1 * | 4/2020 | Schornack | G06F 11/3476 |
| 2020/0195353 | A1 * | 6/2020 | Ye | H04B 10/272 |
| 2020/0335029 | A1 * | 10/2020 | Gao | H10K 59/131 |
| 2021/0105548 | A1 * | 4/2021 | Ye | H04Q 11/0005 |
| 2021/0111794 | A1 * | 4/2021 | Huang | G06N 3/08 |
| 2021/0209470 | A1 * | 7/2021 | Sasagawa | G06F 18/2415 |
| 2021/0232470 | A1 * | 7/2021 | Xie | G06N 3/0499 |
| 2022/0182139 | A1 * | 6/2022 | Zhang | H04B 10/0795 |
| 2022/0239371 | A1 * | 7/2022 | Xu | H04B 10/0795 |
| 2022/0407595 | A1 * | 12/2022 | Varughese | H04B 10/0731 |
| 2023/0023101 | A1 * | 1/2023 | Su | G06N 3/08 |

* cited by examiner

FIG. 13
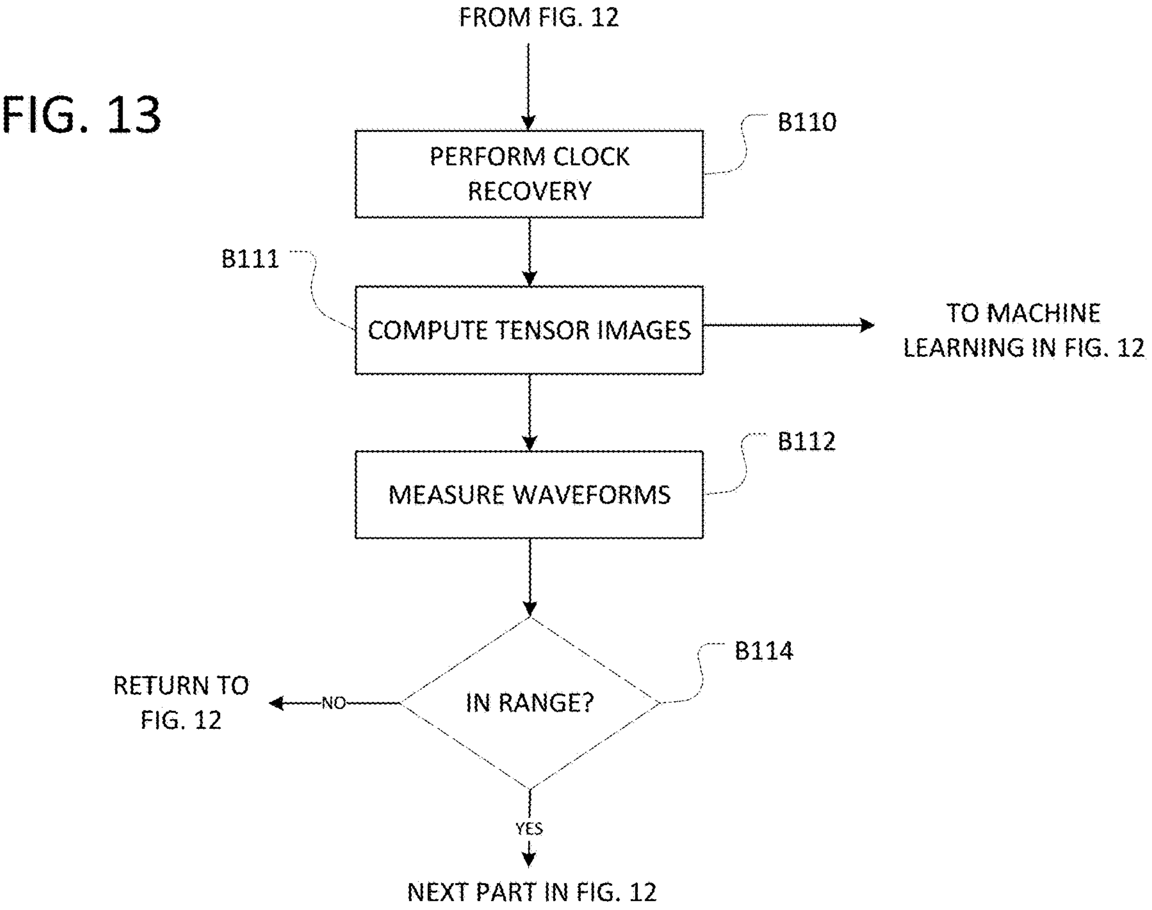
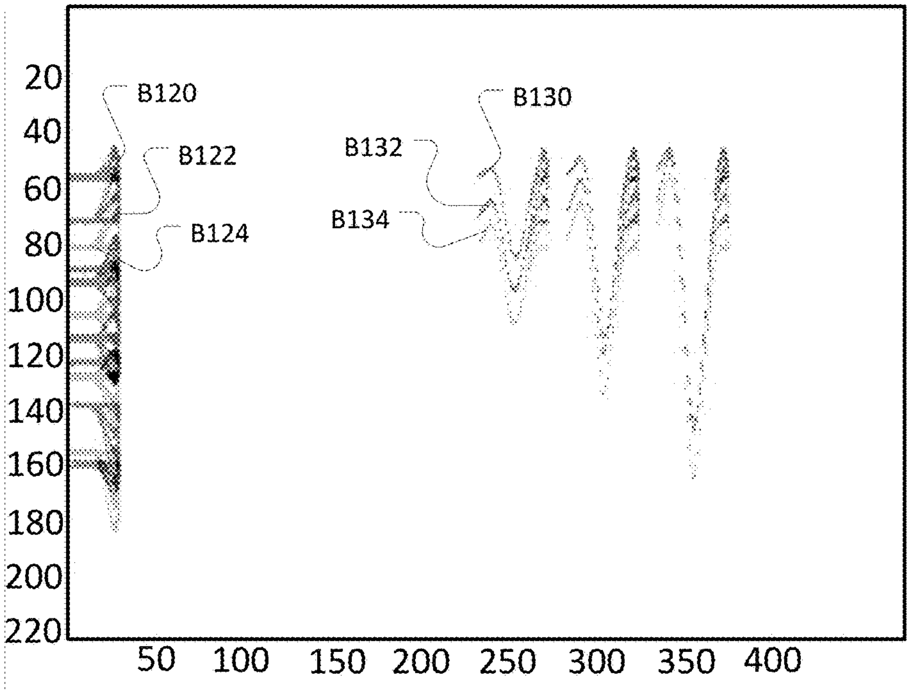
FIG. 14

SYSTEMS AND METHODS FOR TUNING AND MEASURING A DEVICE UNDER TEST USING MACHINE LEARNING

RELATED APPLICATIONS

This application is a continuation-in-part of U.S. patent application Ser. No. 17/701,186, titled "OPTICAL TRANSMITTER TUNING USING MACHINE LEARNING AND REFERENCE PARAMETERS," filed Mar. 22, 2022, now U.S. Pat. No. 11,923,895 issued Mar. 5, 2024, which claims benefit of U.S. Prov. Pat. App. No. 63/165,698 filed Mar. 24, 2021, and U.S. Prov. Pat. App. No. 63/272,998 filed Oct. 28, 2021; a continuation-in-part of U.S. patent application Ser. No. 17/876,817, titled "MACHINE LEARNING FOR TAPS TO ACCELERATE TDECQ AND OTHER MEASUREMENTS," filed Jul. 29, 2022, now U.S. Pat. No. 11,907,090 issued Feb. 20, 2024, which claims benefit of U.S. Prov. Pat. App. No. 63/232,580 filed Aug. 12, 2021; a continuation-in-part of U.S. patent application Ser. No. 17/877,829, titled "COMBINED TDECQ MEASUREMENT AND TRANSMITTER TUNING USING MACHINE LEARNING," filed Jul. 29, 2022, which claims benefit of U.S. Prov. Pat. App. No. 63/232,378 filed Aug. 12, 2021; a continuation-in-part of U.S. patent application Ser. No. 17/701,411, titled "OPTICAL TRANSCEIVER TUNING USING MACHINE LEARNING," filed Mar. 22, 2022, now U.S. Pat. No. 11,923,896 issued Mar. 5, 2024, which claims benefit of U.S. Prov. Pat. App. No. 63/165,698 filed Mar. 24, 2021; and a continuation-in-part of U.S. patent application Ser. No. 18/126,342, titled "TUNING A DEVICE UNDER TEST USING PARALLEL PIPELINE MACHINE LEARNING ASSISTANCE," filed Mar. 24, 2023, which claims benefit of U.S. Prov. Pat. App. No. 63/325,373 filed Mar. 30, 2022. Each of these prior applications is hereby incorporated by reference herein in its entirety.

TECHNICAL FIELD

This disclosure relates to test and measurement systems, more particularly to systems and methods for tuning parameters of a device under test, and measuring performance of a device under test, for example an optical transceiver device.

BACKGROUND

Manufacturers of optical transceivers and transmitters test their transmitters by tuning them to ensure they operate correctly. Each transmitter can take up to two hours to tune as a worst case example. Tuning typically takes the form of sweeping the turning parameters, meaning that the transmitter tunes at each level of each parameter. In the worst case example, it may take up to 200 iterations and three to five iterations in the best case. Speeding up this process to reduce the number of iterations to get the transceiver tuned reduces both the time and therefore, the expense, of manufacturing.

The device under test (DUT) tuning processes may include tuning at different temperatures. The time needed to bring the DUT up or down to each desired tuning temperature(s) contributes significant delay. For example, in some tuning processes, each temperature ramp up time is 180 seconds. Furthermore, it may take additional time to load and remove the DUTs into and out of temperature chambers used for testing.

To validate that device tuning is correct, device manufacturers may use defined performance measurements such as Transmitter Dispersion Eye Closure Quaternary (TDECQ) measurements, for example.

When the signal speed increases, transmitters and receivers typically use equalizers to improve the system performance. For example, the IEEE 100G/400G Ethernet standards define the measurement with a 5-tap feed-forward equalizer (FFE). See, for example, "IEEE 802.3cd-2018," http://standards.ieee.org/develop/project/802.3cd.html, 2018; "IEEE 802.3bs-2017", http://standards.ieee.org/findstds/standard/802.3bs-2017.html 2017.

Many standards have performance measurements that the devices under test must meet. Some standards require measurements made to meet the standard be performed on the equalized signals. For example, IEEE 802.3 standards for 100G/400G specify the TDECQ measurement as a key pass/fail criteria for 26 GBaud and 53 GBaud PAM4 optical signaling. See id. The TDECQ measurement involves a 5-tap FFE. Optimization of the FFE taps improves device performance and increases the likelihood that the device will meet the standard specification requirements.

Speeding up this process saves time and reduces costs. On some production lines where the devices under test (DUTs) number in the tens of thousands, it may take seconds to complete a test. Reducing that time to a second or less would increase production and reduce costs.

Embodiments of the disclosed apparatus and methods address shortcomings in the prior art.

BRIEF DESCRIPTION OF THE DRAWINGS

FIG. 13 shows a flowchart of an embodiment of a portion of a process to use machine learning to tune optical transceivers.

FIG. 14 shows examples of tensor images derived from waveforms for use in a machine learning system.

DETAILED DESCRIPTION

Optical Transmitter Tuning Using Machine Learning and Reference Parameters

Currently, optical transceiver tuning does not employ any type of machine learning to decrease the time needed to tune and test the transceivers. The amount of time it takes to train them increases the overall costs of the transceivers. The use of a machine learning process can decrease the amount of time needed to tune, test and determine if a part passes or fails. The embodiments here use one or more neural networks to obtain the tuning parameters for optical transceivers to allow a determination of whether the transceiver operates correctly more quickly than current processes.

Figure 1:
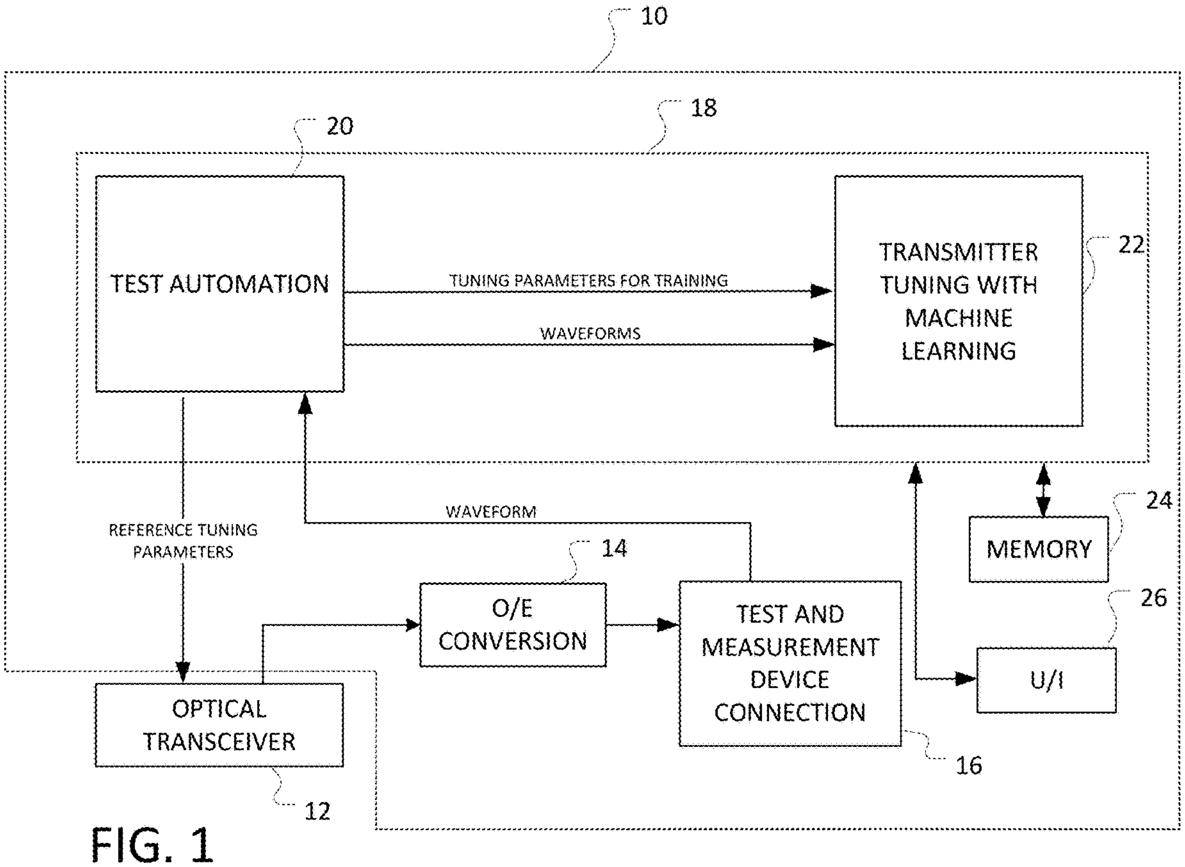
FIG. 1 and FIG. 2 show embodiments of a test and measurement system.

FIG. 1 shows an embodiment of a test and measurement system or device that uses a machine learning system to determine operating parameters for the parts. The output measurements for which the user may tune, and will be used to measure the operation, may include transmitter dispersion eye closure penalty quaternary (TDECQ), extinction ratio, average optical power, optical modulation amplitude, level separation mismatch ratio, among others. The tuning parameters referred to in this discussion comprise the settings loaded into the transceiver to achieve the desired results. These parameters vary widely depending upon the nature of the optical transceivers and the way they operate. They may include values of voltage, current, frequency, modulation, etc.

The test and measurement device 10 may include many different components. FIG. 1 shows one possible embodiment and may include more or fewer components. The device of FIG. 1 connects to the DUT, in this case an optical transceiver 12. The test and measurement device, such as an oscilloscope, may include an optical/electrical (O/E) conversion module 14 that connects to the test and measurement device through a connection such as 16. The processor 18 represents one or more processors and will be configured to execute code to cause the processor to perform various tasks. FIG. 1 shows the machine learning system 22 as part of the test and measurement device. The machine learning system may reside on a separate device such as a computer in communication with the test and measurement device. Similarly, the test automation code 20 executed by a processor may reside in a manufacturing device to which the processor 18 is connected.

For purposes of this discussion, the term "test and measurement device" as used here includes those embodiments that include an external computing device as part of the test and measurement device. The memory 24 may reside on the test and measurement device or be distributed between the test and measurement device and the computing device. As will be discussed in more detail later, the memory may contain training data and run-time data used by the machine learning system. The test and measurement device may also include a user interface 26 that may comprise one or more of a touch screen, video screen, knobs, buttons, lights, keyboard, mouse, etc.

FIG. 1 shows an embodiment of the system during training. In training, the optical transceiver 12 connects to the test and measurement device through the O/E converter 14 and the connection 16. A test automation process 20 sends the transceiver tuning parameters to the transceiver, which may be referred to as "loading" the transceiver in a process discussed in more detail further. The test automation process 20 operates to create training tuning parameters and sends those to the machine learning system 22. The tuning parameters used for training may be based upon, for example, average parameters developed through historical testing using conventional testing methods. The test and measurement device acquires a waveform from the transceiver DUT operating with the loaded tuning parameters, and returns the acquired waveform to the processor. The system may perform measurements on the waveform, and sends the waveform to the machine learning system 22.

Figure 2:
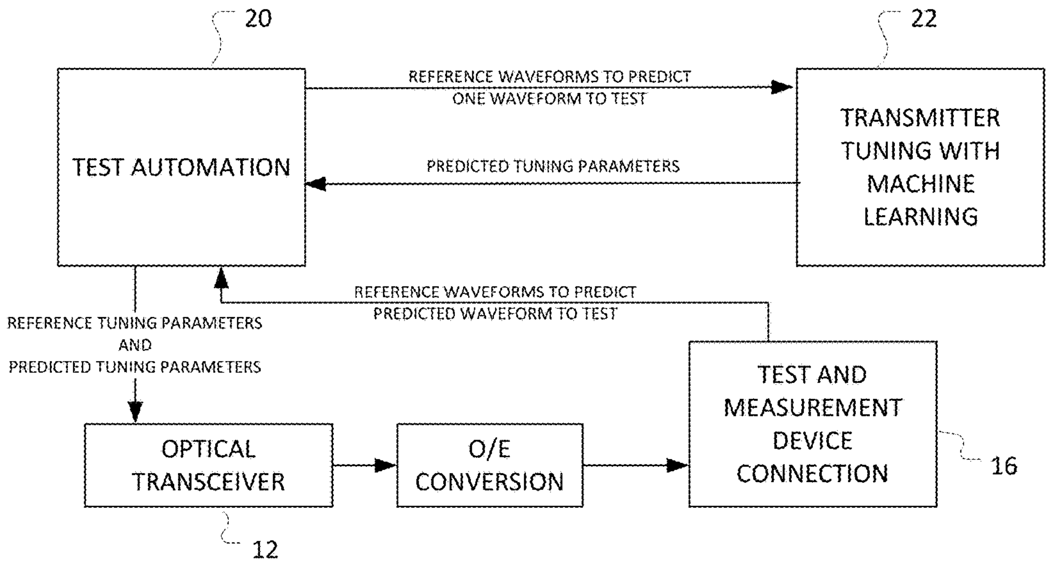

FIG. 2 shows a portion of an embodiment of the system during operation. In a first part of the process the test automation process 20 generates reference tuning parameters and loads them into the transceiver 12. The test and measurement device acquires and returns a set of reference waveforms from the transceiver that the machine learning system will use to predict the optimized turning parameters. The machine learning system then returns the predicting tuning parameters, also referred to as the optimized parameters. The test automation system then loads those predicted parameters into the transceiver. The test and measurement device acquires a newly generated waveform from the transceiver operating with the predicted parameters, referred to here as the predicted waveform, and passes that waveform back to the test automation process to determine if the transceiver passes or fails. This waveform may also pass back to the machine learning system as feedback on the training.

In the discussion here, the term "reference," either parameters or waveform, refers to the set of waveforms generated by the test automation process and used in both training and in run-time operation of the machine learning system. The term "predicted" refers to the output of the machine learning system. The term "optimized" refers to tuning parameters that result from an optimization process from the test automation or the machine learning system.

The below discussion uses waveforms acquired from the transceiver in the test automation process. The embodiments below use three waveforms for non-linear transceivers. No limitation to any particular number of waveforms is intended, nor should any be implied.

Figure 3:
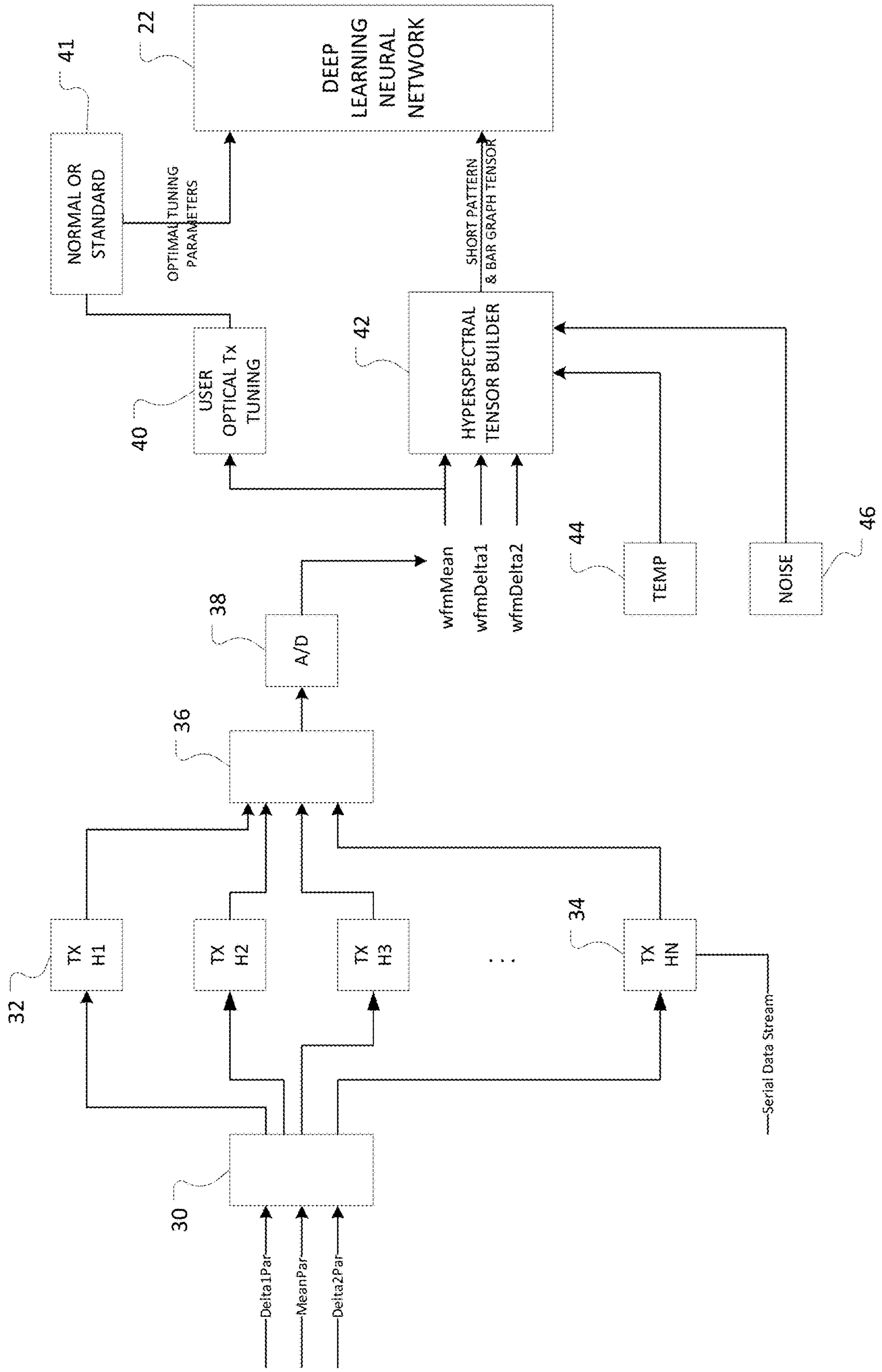
FIG. 3 shows an embodiment of a training process for an optical transmitter tuning system.

FIG. 3 shows a block diagram of an embodiment for a training system for an optical transceiver tuning system using machine learning. The manufacture test automation system measures a quantity of optical transceivers, Tx. The test automation system optimally tunes them using the "standard" or conventional manufacturer tuning process. For training, many example TX units must be measured and optimally tuned to provide data for training. The number of units needs to be sufficient to provide a good distribution for the DUT optimal parameters histogram. Each TX unit is tested in serial fashion, one at a time, as shown by the input serial data stream into Tx 34 that is provided to each Tx.

A histogram for each tuning parameter for each device for each temperature for optimal tuning is created. This is then used to develop an average parameter set. One should note that the process does not have to use an average, or mean, set of parameters, but for ease of discussion and understand this discussion will use that. The user or system could then produce two variations of the mean parameter set, MeanPar, for example by adding to the mean parameters to produce Delta1Par set, and subtracting from the mean parameters to produce Delta2Par set.

The MeanPar set, and the Delta1Par and Delta2Par parameter sets are then used as reference parameters for training and for runtime of the system. The objective is to provide three sample points on the parameters' non-linear characteristics curves so that the neural network has enough data to accurately predict the optimal parameter set by looking at the processed waveforms from these reference parameter settings. The number of reference parameter sets may be from 1 to N where N is limited by compute time and resources. In one example, 200 transceivers undergo testing of five acquisitions with these three parameters sets, resulting in 15 waveforms for every transceiver, totaling 3000 waveforms for training. In FIG. 3, the switch 30 does not comprise a hardware switch but is a logic block that causes each parameter set to be loaded into each transceiver 32 through 34, where again N is only limited by time and resources.

The resulting waveforms are then processed in sequence, represented by switch 36 followed by a digitizer 38. A waveform for each set of reference parameters is stored in memory, such as that shown in FIG. 1. This requires three acquisitions thru the A/D, using a different reference parameter set for each acquisition. The test automation application controls the system temperature associated with a particular set of tuning parameters. In this example, the temperature associated with each set of parameters is provided at 44, as is an instrument noise profile at 46. This temperature is input to the hyperspectral tensor builder 42 and incorporated into the tensor images used for training and run time. Temperature may be shown as a bar graph in the images. However, it may alternatively be represented as pie graph or some other form if desired.

As discussed above the test automation process 20 will use the "standard" tuning process that is to be replaced with the faster machine learning process of the embodiments. The optimal tuning parameters used in training may undergo normalization or standardization depending upon the data at 41. The normalization or standardization rescales the tuning parameter values to fit within a normalized range for the neural network 22 to handle well. In one embodiment, the normalization would be to rescale the tuning parameter to fall with values of 0 to 1, or to center it zero in a range of −1 to 1. One embodiment of a formula for normalization is $y=(x-\min)/(\max-\min)$, where y is the normalized value and x is the original value. If the system uses a pretrained network that does not have built in normalization, it would use this normalization.

The user algorithm 40 tunes each of the Tx device samples for optimal tuning parameters which are then used to train the network to associate the optimal tuning parameters with a given waveform shape and characteristics such as temperature and scope noise. This association is always done using the same input reference tuning parameters stored in the Tx DUT during waveform acquisition.

The hyperspectral tensor building may use a short pattern tensor building process for machine learning. The builder 42 uses the decoded pattern and the input waveform to search down the record length and look for pre specified patterns which may be defined from a unit interval in the machine learning system or may be hidden from the user depending on the application. Several different patterns may be used. For optical tuning, the system may use a short pattern of each level with no transitions for five single unit intervals are used to view the PAM4 levels by the machine. This allows the machine to recognize the Tx levels parameters settings more readily.

For recognizing FFE taps of the TX parameter settings, impulse response code sequences, i.e. short patterns, are pulled out and placed into the images input to the neural network 22. The term hyperspectral is used in the sense that the image input to deep learning neural network 22 has three color channels labeled as R, G, and B (red, green and blue). The waveforms making up these hyperspectral images are not actually in these colors, but rather the system uses the three color channels to incorporate the different images created by tensor builder. The system collects three waveforms and each of the images from each of the three waveforms goes into one of the color channels. For example, without limitation, the wfmMean that results from the MeanPar data set may be on the Red channel, wfmDelta1 from the Delta1Par set on the Blue channel, and wfmDelta2 from the Delta2Par set on the Green channel. No limitation to these channels exists. Additional color channels in addition to RGB may be incorporated if desired. The pretrained deep learning networks used here only have the three color channels, but more channels could result from a custom deep learning network, or multiple pretrained three-color channel networks.

As will be discussed in more detail further, the discussion here shows two instances of tensor builders. One creates images used for training the optimal parameter network. The other may be used for tuning a network that outputs TDECQ (transmitter dispersion eye closure quaternary), and optimized FFE (feed-forward equalization) filter taps. In summary, the machine learning system is trained to receive waveform tensor images and output a set of optimized transmitter parameters, and may also output a set of optimized FFE taps and TDECQ.

Figure 4:
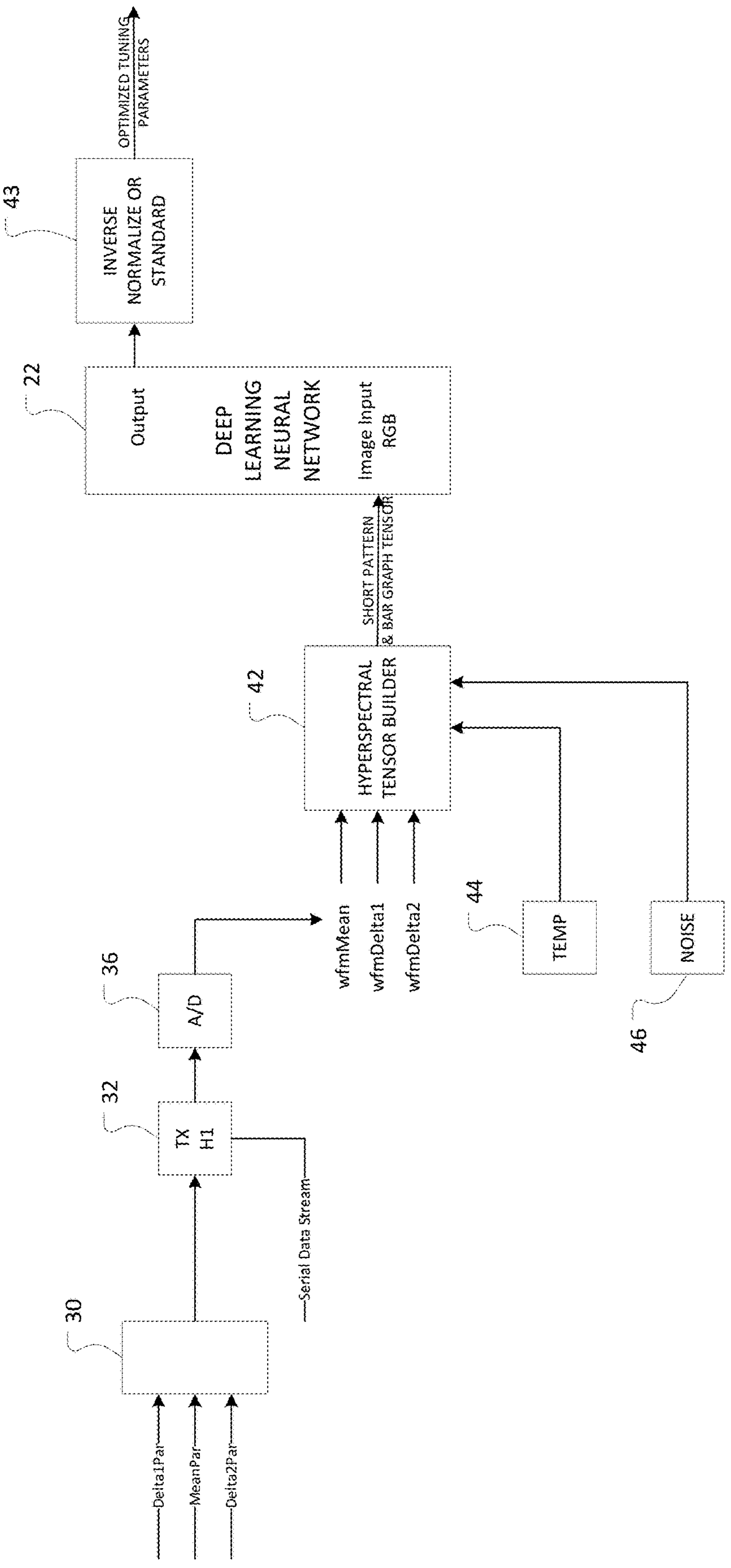
FIG. 4 shows an embodiment of a run-time process for an optical transmitter tuning system.

FIG. 4 shows a block diagram of an embodiment of a run-time system for an optical transceiver tuning system using machine learning. During run time, the user's automation test application will switch in three different reference sets of tuning parameters to a single transceiver undergoing testing such as 32 and acquire a waveform for each one, represented by switch 30. The TDECQ analysis, shown as 90 in FIG. 6, will resample waveforms, decode the pattern, and align the pattern and the waveform. It will not compute TDECQ during runtime. TDECQ and FFE taps will be output from the second trained deep learning network, shown at 100 in FIG. 6. The hyperspectral tensor builder 42 blocks will create the same kind of tensor images including bar graphs that were created during training. These tensor images will be inputs to the trained deep learning neural network 22. The outputs of the trained deep learning neural network 22 are optimal tuning parameters, TDECQ, and optimized FFE taps. The system then applies an inverse normalization or standardization block 43 to obtain the desired values out of the neural net output.

Figure 5:
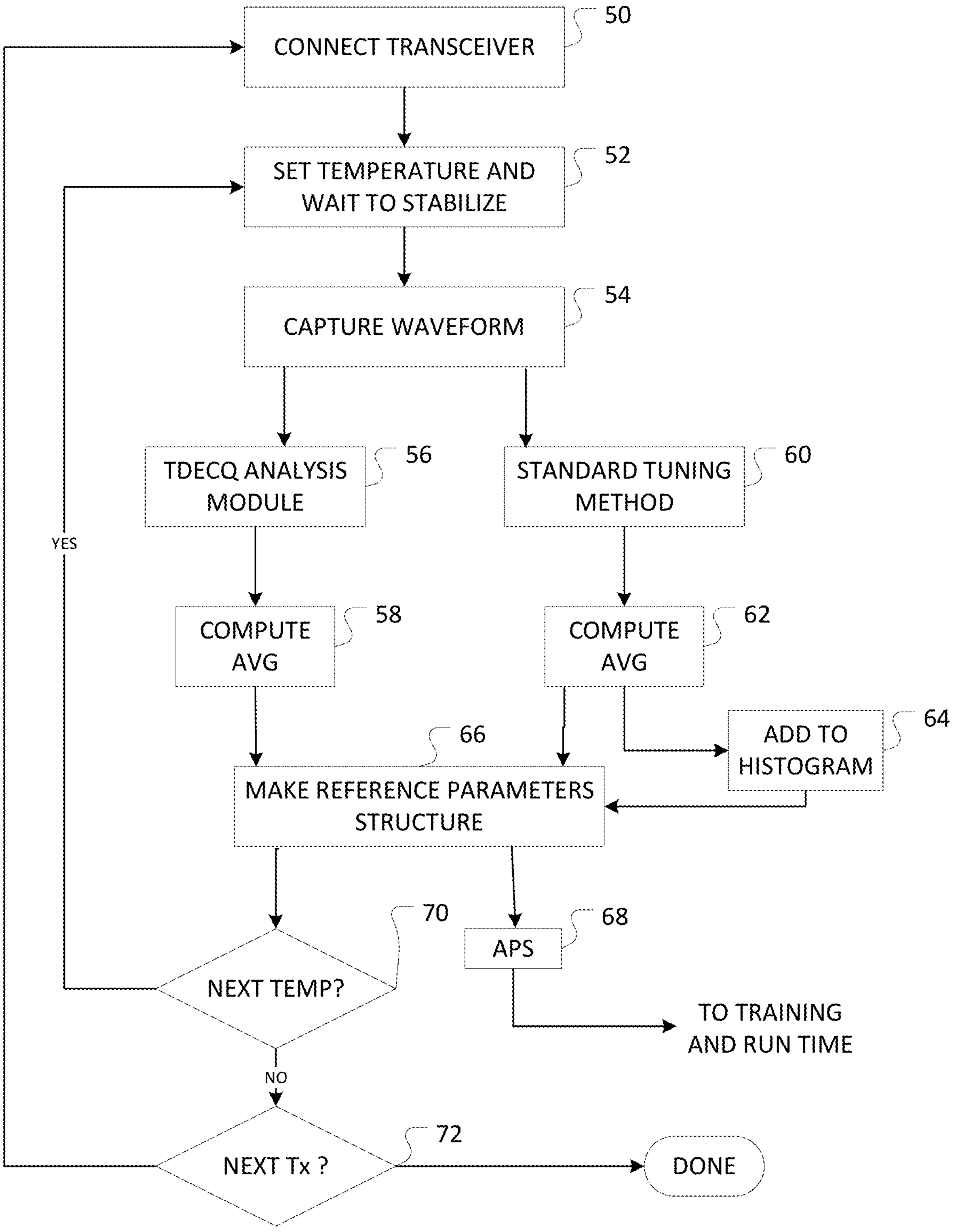
FIG. 5 shows a flowchart of an embodiment of a method to obtain a population of tuning parameters.

FIG. 5 shows an embodiment of a method to obtain a histogram of optimized tuning parameters to be used in the training and run-time processes. This process uses the conventional "standard" tuning method to generate the histogram and average values used to create an average parameters structure (APS). The manufacturer connects the transceiver to the test and measurement system at 50, then sets the temperature and waits for it to stabilize at 52. The waveform from the transceiver is then acquired at 54. The TDECQ analysis at 56 then allows the system to compute an average at 58. Similarly, the standard tuning method at 60 will result in tuning parameters for each transceiver that can be averaged at 62. This also allows the building of a histogram used in training at 64. All of this information creates an average parameters structure (APS) at 66, discussed in more detail with regard to FIG. 6, which is sent to the training and run-time processes at 68.

The process then loops as many times as necessary. For each transceiver, the temperature changes until the transceiver has completed tests for the desired temperature range at 70. The process then moves onto the next transceiver at 72 until a sufficient number have been completed to ensure a high enough level of accuracy.

Figure 6:
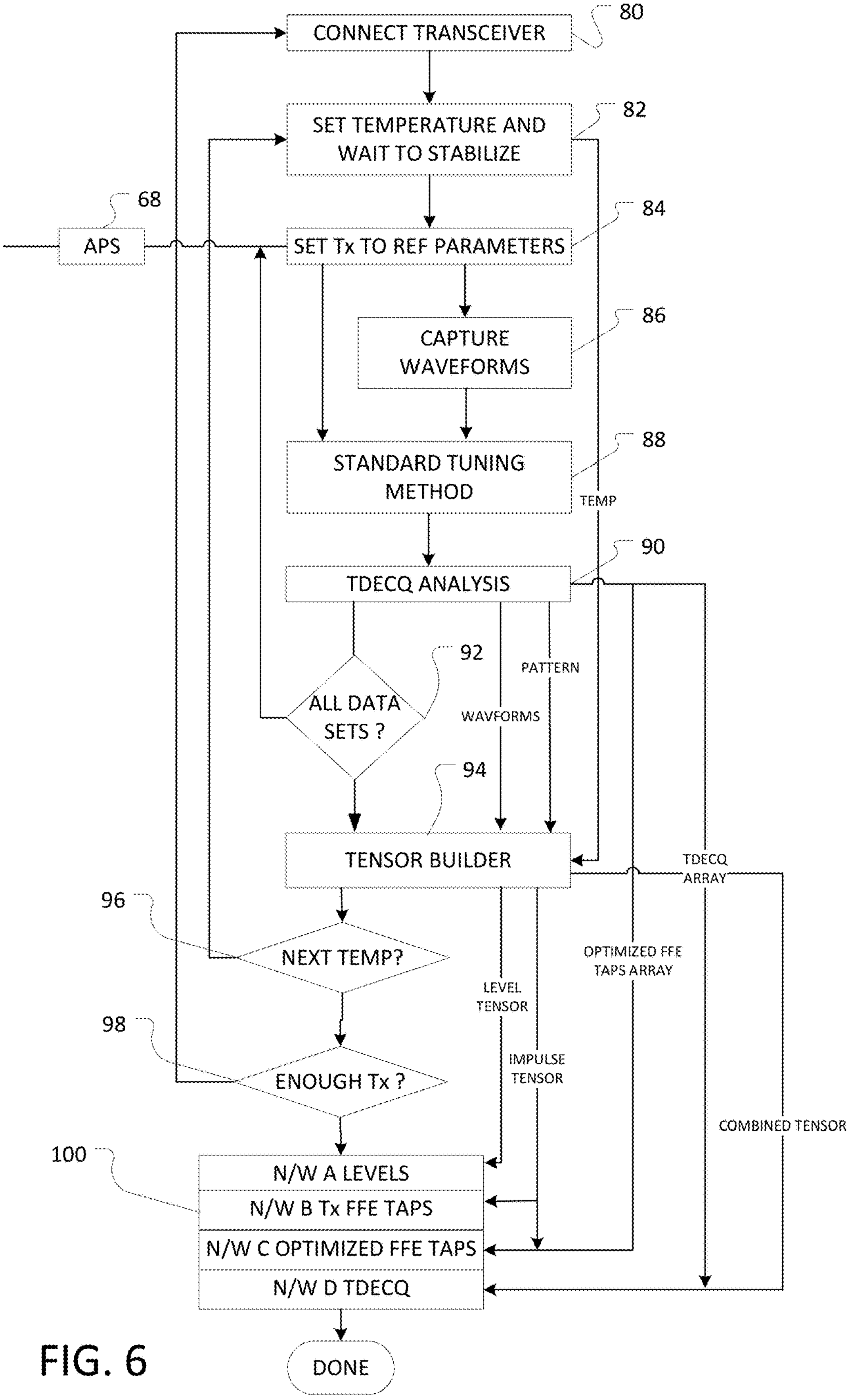
FIG. 6 shows a flowchart of an embodiment of a method to train a neural network to obtain optimized tuning parameters for optical transceivers.

FIG. 6 shows a flowchart of an embodiment of training a machine learning system to prepare it for performing run-time predictions of optimized transceiver parameters. The user connects the transceiver to the test and measurement system at 80, sets the temperature and waits for it to stabilize at 82. At 84, the transceiver is loaded with one of the reference parameter sets in the average parameter structure (APS) 68 from FIG. 5. The transceiver then operates and the test and measurement system captures, that is acquires, the waveform at 86. The user then performs the standard tuning method at 88, and the system performs TDECQ analysis module at 90. This repeats as noted at 92 until all three reference parameter sets have been run. The TDECQ analysis module then sends the waveforms and patterns for all the reference sets to the tensor builder at 94. The TDECQ module resamples the waveforms, decodes the pattern and aligns the pattern and the waveforms prior to sending those to the tensor builder. There is only one pattern in this embodiment because it is the same for all the waveforms that are processed for training and for run-time.

The tensor builder then produces several outputs and sends them to the neural network, which may comprise multiple sub-networks within the machine learning system. The tensor builder sends a level tensor to a first neural net, identified as neural network A, an impulse tensor to the transceiver FFE taps neural network B, the impulse tensor to the optimized FFE taps neural network C, along with the optimized FFE taps array from the TDECQ module, and a combined tensor to the neural network D for the TDECQ results. This continues until the current transceiver cycles through all of the temperatures at 96, and then repeats for all of the transceivers at 98, until enough have been processed, at which point the training process ends. A determination as to whether enough transceivers have been processed may involve testing the machine learning system to determine its accuracy.

Figure 8:
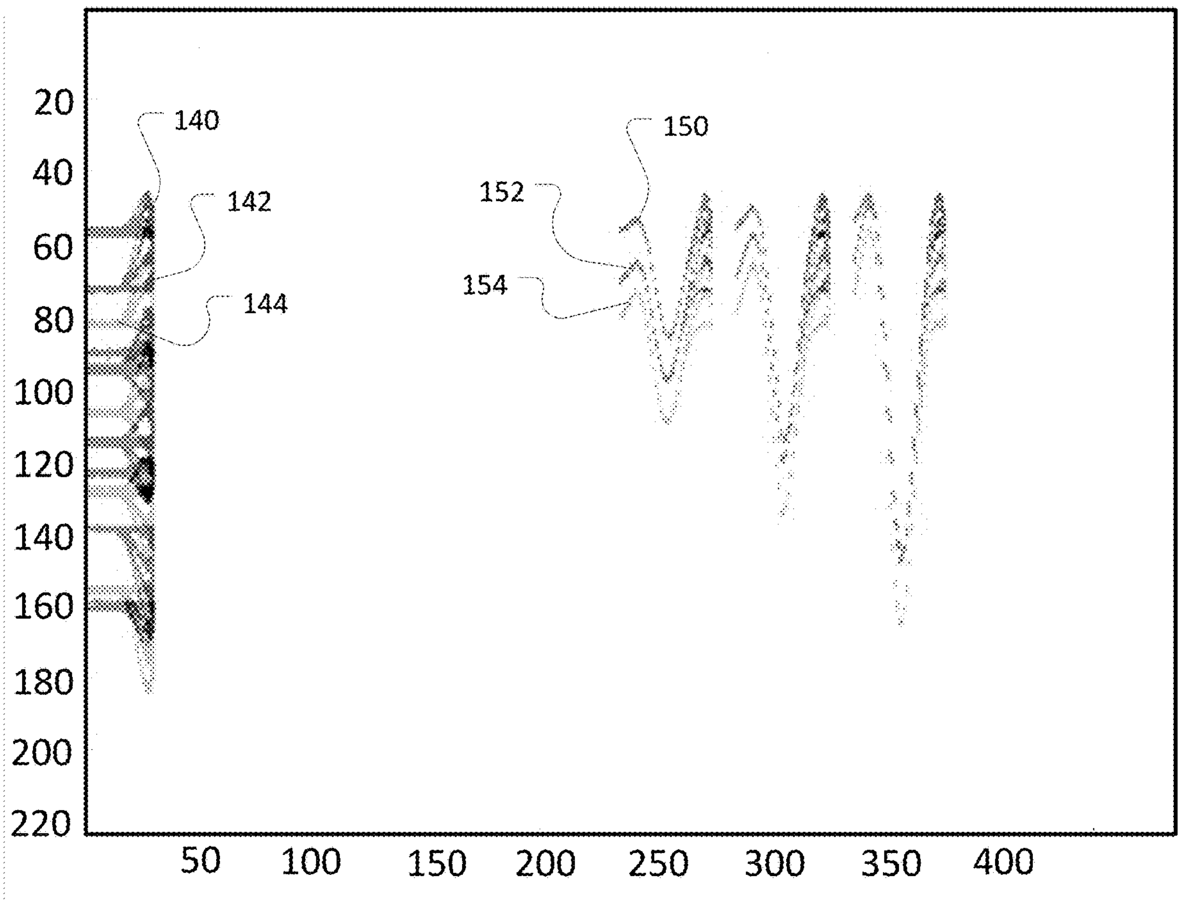
FIG. 8 shows examples of waveforms and tensor images.

FIG. 8 shows examples of the original 4-level pulse amplitude modulation (PAM4) images from the waveforms, and the resulting tensors. As discussed above, this embodiment uses three channels. FIG. 8 shows the input waveforms on the left, with the three channels showing the input waveforms on the Red channel 140, Blue 142 and Green 144. The tensor 150 and the tensors in the same position across the figure correspond to the Red channel, the position of tensor 152 corresponds to the Blue channel, and the position of tensor 154 corresponds to the Green channel.

Figure 7:
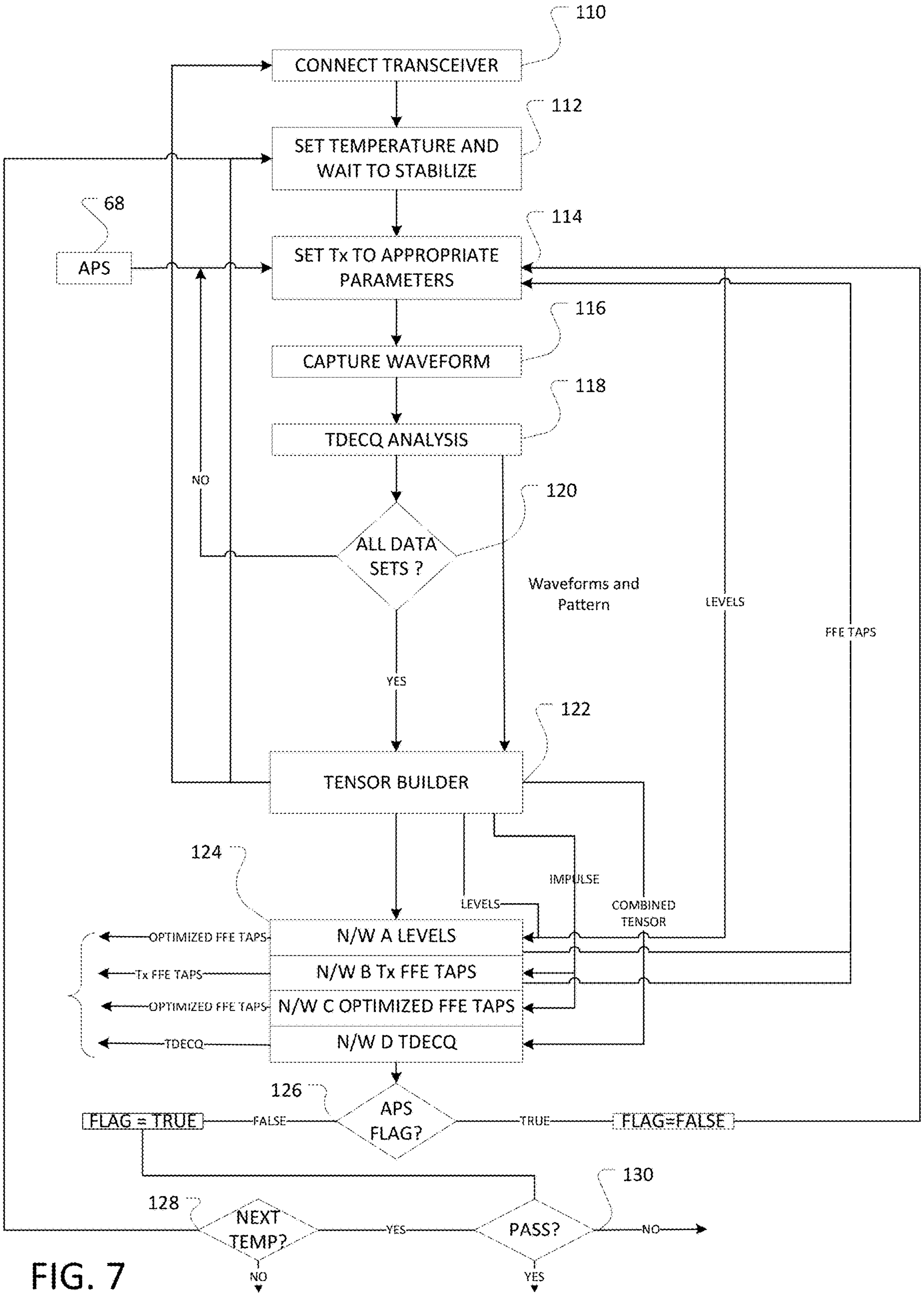
FIG. 7 shows a flowchart of an embodiment of a method to use a neural network to obtain optimized turning parameters for optical transceivers.

Once trained and validated, the machine learning system will operate at run-time. FIG. 7 shows a flowchart of an embodiment of this process. The user connects the transceiver at 110, sets the temperature and waits for it to stabilize at 112. The reference parameters contained in the average parameter structure 68 are loaded into the transceiver at 114 as the appropriate parameters for this part of the process. As will be discussed in more detail, the appropriate parameters may change depending upon where the transceiver is in its cycle.

The process continues similar to the training cycle by capturing or acquiring the waveform at 116 and performing the TDECQ analysis at 118. At 120, the system checks if the transceiver has undergone the process for all three of the reference parameter sets. Once all three reference sets have completed, the three waveforms and the decoded pattern are sent to the tensor builder at 122. The tensor builder creates a tensor image for all three waveforms, and combines them all into a RGB image, as previously discussed. Similar to the training process, the tensor builder sends the levels tensor, the impulse tensor and the combined tensor image to the neural network 124. During run-time, however, the neural network(s)/machine learning system produces the optimized FFE taps, and TDECQ information to provide a predicted, optimized set of tuning parameters for the transceiver.

After the predictions are made, the APS flag is set to false at 126. When the process returns to 114 to set the transceiver to the appropriate parameters, the appropriate parameters are now the predicted tuning parameters. This also indicates that the system should only acquire one waveform, and only one tensor image is generated, and the neural network D produces a single TDECQ value. The APS flag remains false at 126, so the value is checked at 130 and the transceiver either passes or fails. If it passes, then the next temperature is selected at 128 if any still need to be tested, or the process ends.

In this manner, more than one neural network has been trained within the overall neural network/machine learning system. Two networks predict optimal transmitter tuning parameters, one, network C, is used to predict the FFE taps, and D is used to predict a TDECQ measurement.

The system uses the TDECQ measurement during training as input to network D so that network D associates an input waveform with a TDECQ value. Similarly, the optimized FFE taps out of the TDECQ module were used during training for the C network so that the C network associates waveforms with optimized tap values. Both Networks A and B provided tuning parameters to associate with three reference waveforms. Network A provided levels and gain type parameters. Network B associated FFE tuning parameters. The transmitter has FFE built into it and so the taps of the FFE filter are tuning parameters.

The optimized FFE taps out of the TDECQ module are different. They are not tuning parameters for the TX but they represent what one would have set an FFE to in order to open up the eye as much as possible in order to make the TDECQ measurement. Those FFE taps are applied to the waveform prior to making the TDECQ measurement.

While the embodiments described above are discussed using the example application of optical transceiver tuning processes, embodiments of the disclosure may be used in any process involving adjustment of operating parameters of any type of device under test, and may be especially useful to improve processes involving iterative adjustment of operating parameters to achieve a desired performance measurement of the DUT or to achieve a passing test result for the DUT.

Optical Transceiver Tuning Using Machine Learning

Figure 9:
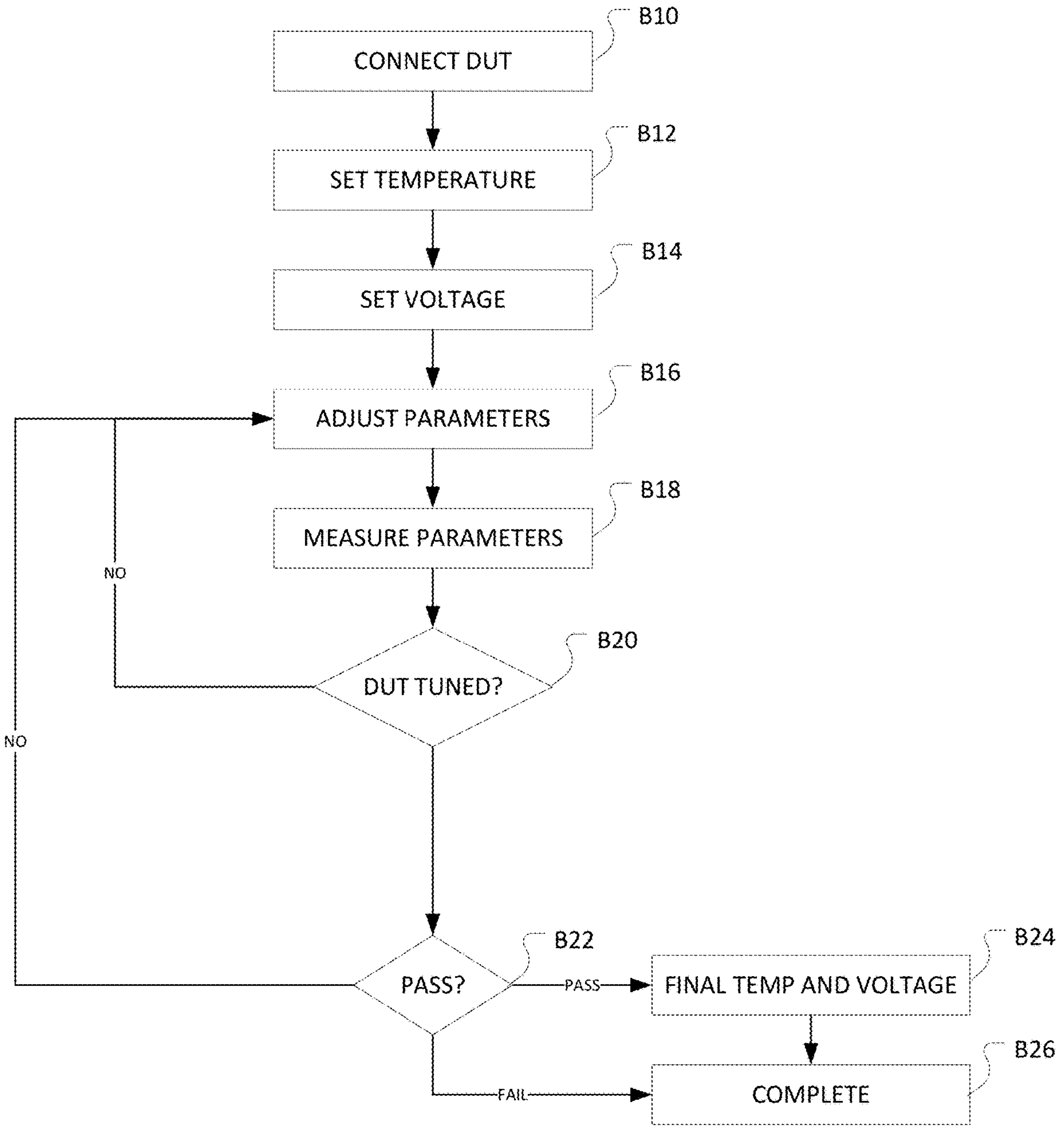
FIG. 9 shows an example of a manufacturing workflow for tuning optical transceiver parameters.

Currently, optical transceiver tuning does not employ any type of machine learning to decrease the time needed to tune and test the transceivers. The amount of time it takes to train them increases the overall costs of the transceivers. A typical manufacturer workflow is shown in FIG. 9. At B10, the user connects the optical transceiver to a test and measurement device. As used here, the term "test and measurement device" includes any device capable of performing tests and measuring the resulting operation of the optical transceiver as a device under test.

The user sets a temperature at B12 and waits until the temperature stabilizes. The user then sets the voltage at B14. The user sets the operating parameters for the DUT at B16, operates the DUT and then measures its operation. Measurement may take many forms, as will be discussed in more detail later. At B18, the system determines if the measurement indicates that the part operates within a desired range of the measured values. If it operates with the desired range or ranges, at B20, the transceiver passes at B22. The final temperature and voltage used in the test may be stored and used for the next transceiver at B24 and then the test completes for that part.

If the DUT is not tuned at B22, then the user may adjust the parameters at B16 and re-run the test back through B22. This process may be completed many times until the DUT either passes the test or fails and the test completes at B26.

This is a time intensive, and ultimately expensive, process. The embodiments here employ machine learning to both provide a more accurate starting point and to adjust the parameters more efficiently.

Figure 10:
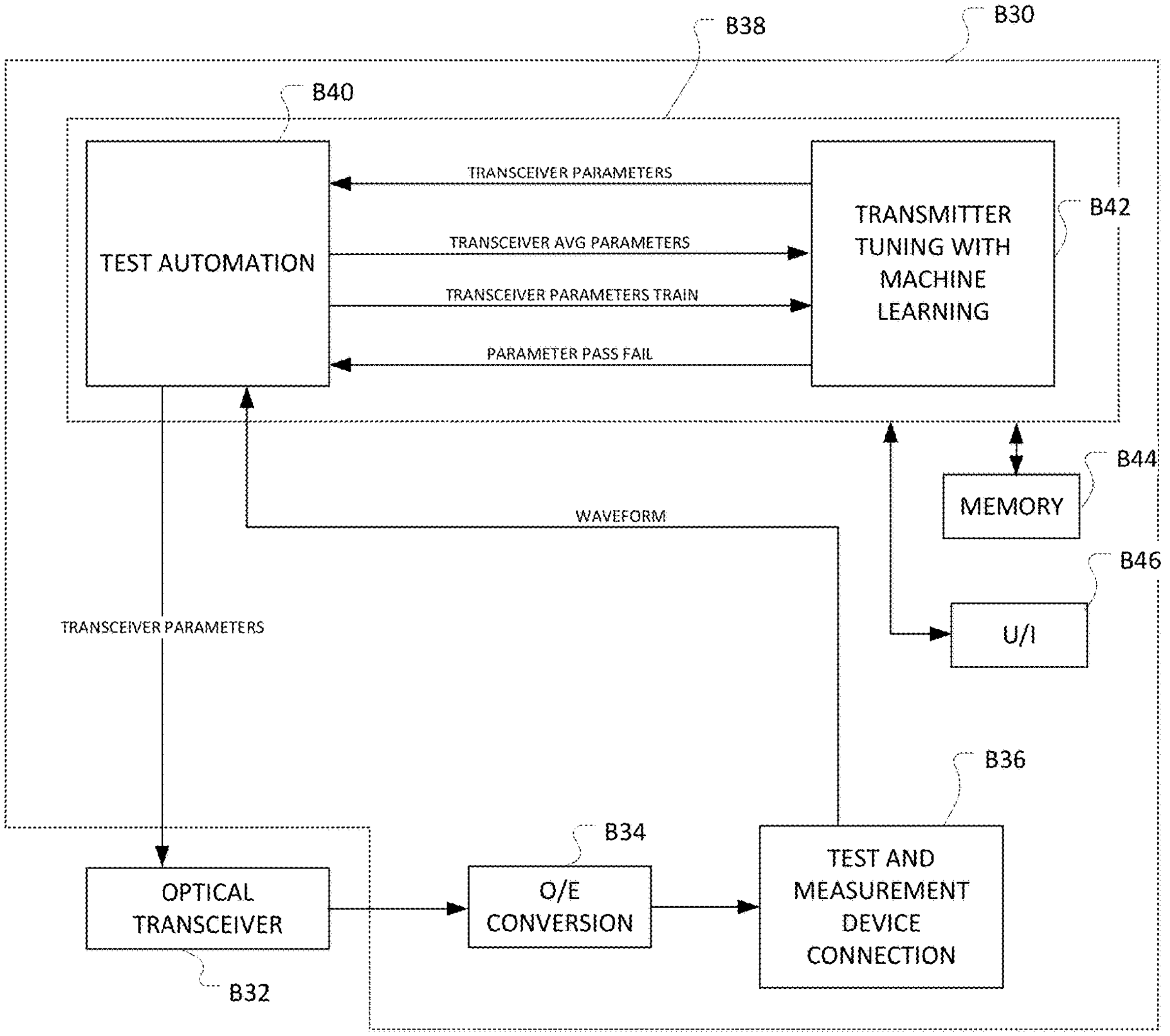
FIG. 10 shows a test and measurement device usable to tune optical transceivers.

The use of a machine learning process can decrease the amount of time needed to tune, test and determine if a part passes or fails. FIG. 10 shows an embodiment of a test and measurement system or device that uses a machine learning system to determine operating parameters for the parts. The output measurements for which the user may tune, and will be used to measure the operation, may include transmitter and dispersion eye closure penalty quaternary (TDECQ), extinction ratio, average optical power, optical modulation amplitude, level separation mismatch ratio, among others. The tuning parameters of the optical transceivers that may be changed or adjusted may include such things as bias current, modulation voltage, and others.

The test and measurement device B30 may include many different components. FIG. 10 shows one possible embodiment and may include more or fewer components. The device of FIG. 10 connects to the DUT, in this case an optical transceiver B32. The test and measurement device, such as an oscilloscope, may include an optical/electrical (O/E) conversion module B34 that connects to the test and measurement device through a connection such as B36. The processor B38 represents one or more processors and will be configured to execute code to cause the processor to perform various tasks including the manufacturer's test automation code B40. Or, the test automation code could be part of another computing device separate from the test and measurement device B30, with which the processor B38 interacts. FIG. 10 shows the machine learning system B42 and the manufacturer's test automation code B40 as part of the test and measurement device. The machine learning system and/or the test automation code/system may also reside on a separate device such as a computer in communication with the test and measurement device.

For purposes of this discussion, the term "test and measurement device" as used here includes those embodiments that include an external computing device as part of the test and measurement device. The memory B44 may reside on the test and measurement device or be distributed between the test and measurement device and the computing device. As will be discussed in more detail later, the memory may contain training data and run-time data used by the machine learning system. The test and measurement device may also include a user interface B46 that may comprise one or more of a touch screen, video screen, knobs, buttons, lights, keyboard, mouse, etc.

In operation, the optical transceiver B32 connects to the test and measurement device through the O/E converter B34 and the connection B36. A test automation process B40 sends the transceiver tuning parameters to the transceiver. The transceiver parameters are received from the machine learning system B42, and may be based upon average parameters developed through testing and training. The test and measurement device acquires a waveform from the transceiver DUT and returns the waveform to the processor. The system measures the waveform and determines whether the transceiver has a pass or fail for that set of tuning parameters.

One measurement, mentioned above is TDECQ, which is using a PAM4 eye diagram. As discussed above, this comprises one of the performance measurements for which the transceiver may be tuned, with others that may include extinction ratio (ER), average optical power (AOP), optical modulation amplitude (OMA), level separation mismatch (RLM) ratio and others.

Figure 11:
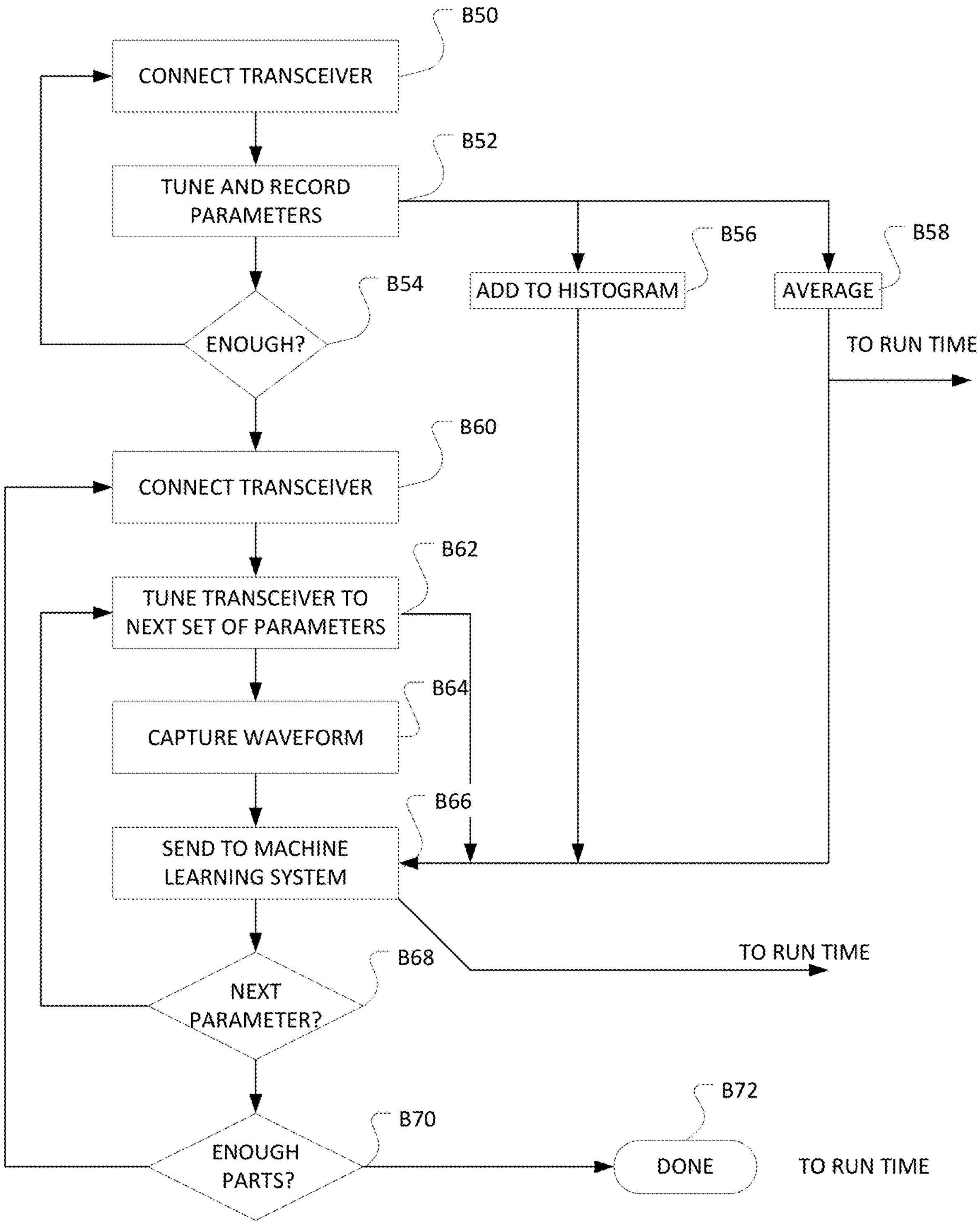
FIG. 11 shows a flowchart of an embodiment of a process to train a machine learning system for tuning optical transceivers.

The machine learning system B42 performs the run time selection and adjustment of the tuning parameters based upon its training. The training process builds a training set of tuning parameters and associated waveforms that can then inform the selection of the tuning parameters based upon the waveform acquired from the DUT. FIG. 11 shows a process of training a machine learning system that also provides starting parameters for a run-time testing process.

In the below discussion, several terms have specific meanings. In training the machine learning system, the process requires a set of parameters and associated waveforms for training. As discussed in detail below, the user optimally tunes a large number of transceivers that results in a set of parameters referred to here as "optimized parameters" and contains the optimized parameters for each of the large number of transceivers. The term "average parameters" refers to a set of parameters each of which represents the average of that particular parameter.

In a first iterative sub-process, a user connects an optical transceiver to the test and measurement device at B50. Typically, this process incudes allowing the temperature of the transceiver to stabilize. The transceiver undergoes standard tuning at B52, meaning any current tuning procedure used before the implementation of the embodiments here. Once a particular transceiver undergoes tuning to reach its tuned state, the parameters used at that state are the optimized parameter for that transceiver. The optimized parameters from each of these iterations are gathered, such as into a histogram, at B56, and an average is determined at B58.

As will be discussed in more detail with regard to FIG. 12 and the run-time environment, these averages will act as the initial starting parameters for the run-time process. This process continues until enough transceivers have undergone tuning as determined at B54. The determination of how many transmitters are enough may depend upon the architecture of the machine learning system and how many the system requires to produce accurate results.

A second iterative sub-process begins at B60. The user connects the transceiver, and lets the temperature stabilize. The transceiver undergoes tuning to a "next" set of parameters at B62, which for the first iteration comprises an initial set of parameters. The system also records these parameters to be sent to the machine learning system. Each iteration will sweep the parameters, meaning that the system adjusts each parameter to the next setting for that parameter until all settings for that parameter have completed.

The system captures the waveform at B64 for each set of parameters and will also send the waveform to the machine learning system. As part of capturing the waveform, the system may perform clock recovery and generate a partial eye diagram, also known as a short pattern overlay. In one embodiment, the partial eye diagram may include only single level transitions, where a single-level transition means a transition from one level only to one other level one transition from low to high, high to low, etc., such as the separated single-level partial eye diagrams described in U.S. patent application Ser. No. 17/592,437. This resulting overlay may comprise the waveform sent to the machine learning system, although the waveform may be represented in other formats or vector spaces in other embodiments. In one embodiment, as part of the waveform capture, the system also calculates a number of measurements, such as TDECQ, OMA, ER, AOP, RLM, as mentioned above. At B66, the system sends the information gathered, including the histograms, averages, and the information specific to each iteration, such as the waveform, short pattern overlay, measurements, to be associated with each set of parameters to the machine learning system for processing. The machine learning system associates all of this information with the waveform to train it to identify the most accurate parameters for the next iteration. This process repeats until all of the iterations for the parameter being swept as checked at B68.

As part of the machine learning training process, the system undergoes testing and validation. The system will provide test waveforms to the machine learning system to have it generate predictions for the next set of parameters, then test those parameters to see if the machine learning system made an accurate prediction. The process of training continues until enough transceivers have undergone screening at B70 until the machine learning system produces results with a desired accuracy. Once this has been achieved, the training process completes at B72 and the system can move to run-time use. One should note that the system may return to the training process as needed, such as if the prediction accuracy drops, or some change occurs in the nature of the transceivers being tested.

Figure 12:
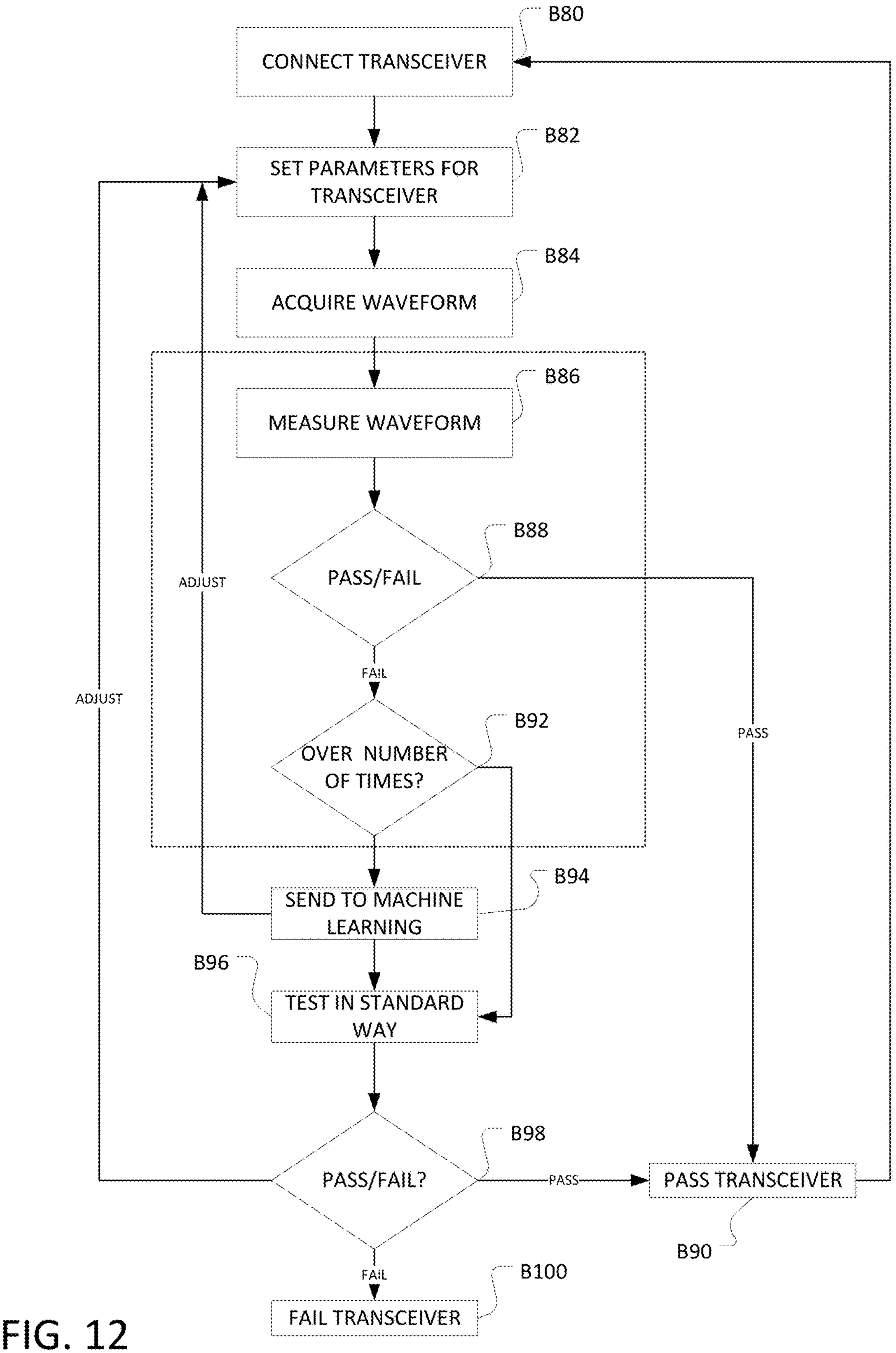
FIG. 12 shows a flowchart of an embodiment of a process to use machine learning to tune optical transceivers.

FIG. 12 shows an embodiment of a method of testing optical transceivers in the runtime environment. At B80, a user connects the transceiver to the test and measurement device and allows the temperature to stabilize. The temperature may comprise one of the adjustments made and multiple iterations may include different temperatures. The system tunes the transceiver to a set of operating parameters at B82. As used here, the term "operating parameters" means the parameters set for the transceiver. The operating parameters may change depending upon the point in the process. Initially, the process sets the operating parameters to the average parameters developed in the first part of the training process. The test and measurement device acquires a waveform from the transceiver at 84. As in the training process, this may include performing clock recovery and generating a partial eye diagram overlay with only single level transitions. The system may also perform measurements such as TDECQ, ER, AOP, OMA, RLM and others at B86. If the results indicate that the operation of the transceiver lies within a desired range at B88, the transceiver passes at B90.

In one embodiment, the measurement and determination of pass fail shown in FIG. 12, the process performs clock recovery B110 and from that generates tensor images at B111, as shown in FIG. 13. An example tensor image is shown in FIG. 14. FIG. 14 shows the input waveforms on the left, with the three channels showing the input waveforms on the Red channel B120, Blue channel B122 and Green channel B124. The tensor B130 and the tensors in the same position across the figure correspond to the Red channel, the position of tensor B132 corresponds to the Blue channel, and the position of tensor B134 corresponds to the Green channel. Short pattern images created from the acquired waveform may be placed into all three color channels. Different code sequences may be placed into different color channels. Many combinations of patterns and channels are possible.

The tensor images are sent to the machine learning system as the waveform images used in the machine learning system. The process then measures the waveforms at B112 at FIG. 13 and these are then checked to see if they are in range at B114. The process then returns to FIG. 12 at B88.

Referring back to FIG. 11, for this embodiment, this process of capturing the waveform, would include generating an image and tensors to be used in the machine learning system. The machine learning system would be trained with these types of tensor images. This allows the system to use the tensor images in the machine learning system at runtime.

If the results show that the transceiver does not operate within the desired range of whatever measurement(s) used, the transceiver fails. The system may check to see how many times the transceiver has undergone the process at B92. If the number of times is under a predetermined number, the results are sent to the machine learning system at B94 for determination of a next set of operating parameters. The machine learning system then provides estimated parameters for the next iteration. In one embodiment, the operating parameters for the transceiver in the next iteration comprise "adjusted parameters" resulting from subtracting the estimated parameters from the previous operating parameters to find a difference, and then adding the difference back to the average parameters to produce new operating parameters.

Returning to B92, if the machine learning process has repeated a number of times and the transceiver continues to fail, the system uses the "standard" procedure for tuning at B96. This comprises any tuning procedure previously used prior to the implementation of the embodiments here. The process then continues until the operation of the transceiver meets the desired measurements at B98 and the transceiver passes at B90. However, if even after the standard tuning process, the transceiver cannot be adjusted to operate within the desired range, the transceiver is failed at B100.

In this manner, a machine learning system can increase the efficiency of the tuning process. This allows the system to pass or fail the transceivers more quickly and reduces both the time and expense of the manufacturing process.

Combined TDECQ Measurement and Transmitter Tuning Using Machine Learning

Testing a device under test (DUT) using machine learning may involve an iterative process in which the DUT receives a set of tuning parameters. When the DUT operates using that set of tuning parameters, it produces results for measurement against a value or range of values that determine if the device passes or fails. The below discussion may employ examples of tuning and testing an optical transmitter or transceiver to provide a contextual example. The embodiments here apply to any DUT that undergoes a testing process to determine whether the DUT operates as needed to pass.

Figure 15:
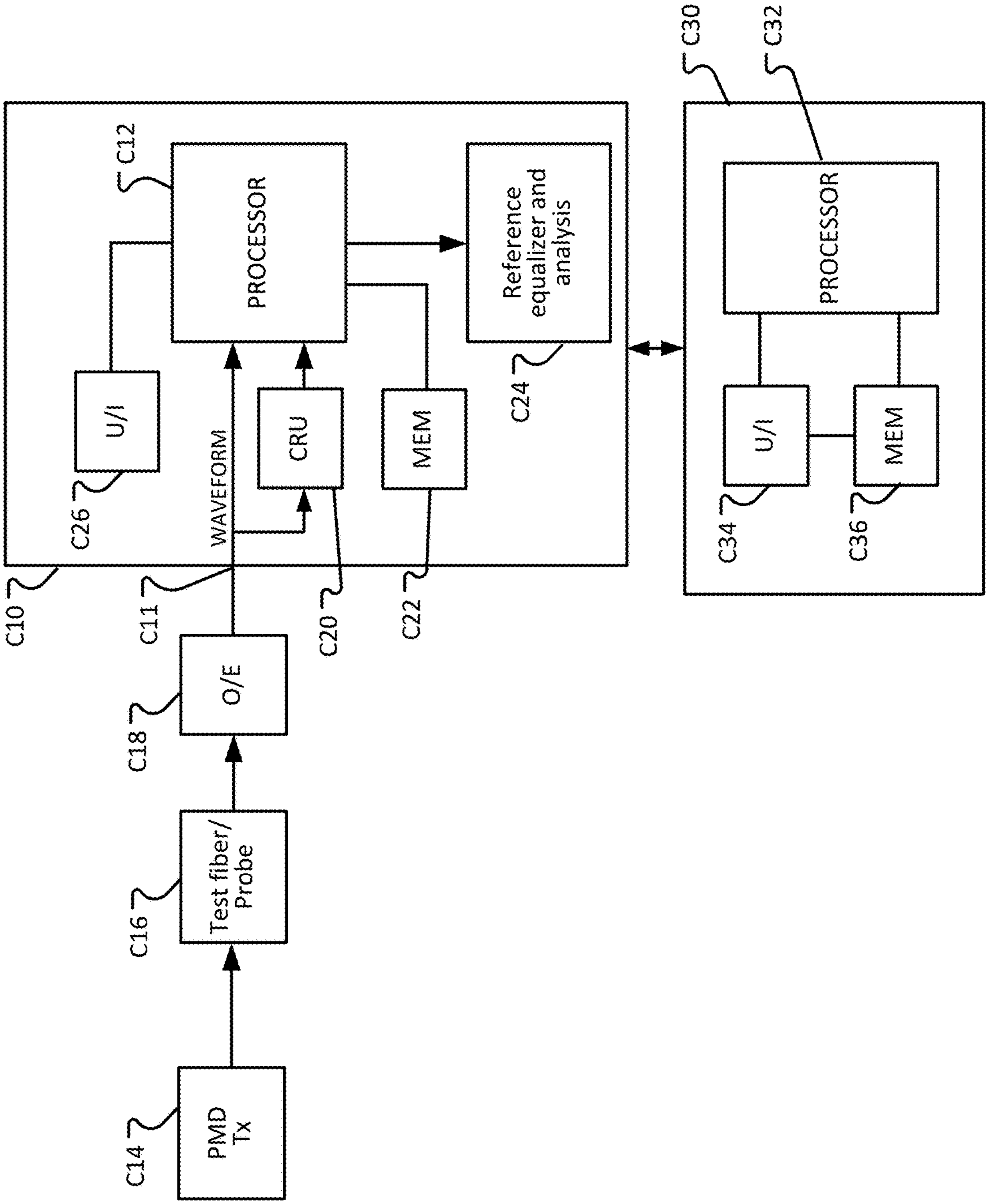
FIG. 15 shows an embodiment of a test and measurement system.

FIG. 15 shows an embodiment of a testing setup in the instance of an optical transmitter C14 as a DUT. The testing setup includes a test and measurement system that may include a test and measurement instrument such as an oscilloscope C10 and a test automation platform C30. The test automation platform C30 may reside on a manufacturing line to perform pass/fail analysis of the DUTs. The test and measurement instrument C10 receives an electrical signal from the DUT C14 at an input C11, typically through an instrument probe C16. In the case of an optical transmitter, the probe will typically comprise a test fiber coupled to an optical to electrical converter C18 that provides the electrical signal to the test and measurement instrument to be sampled, digitized, and acquired as a waveform that represents the signal from the DUT. A clock recovery unit (CRU) C20 may recover the clock signal from the waveform data, if the test and measurement instrument C10 comprises a sampling oscilloscope for example. The test and measurement instrument has one or more processors represented by processor C12, a memory C22 and a user interface C26. The memory may store executable instructions in the form of code that, when executed by the processor, causes the processor to perform tasks. The memory may also store the acquired waveform. The user interface C26 of the test and measurement instrument allows a user to interact with the instrument C10, such as to input settings, configure tests, etc. The reference equalizer and analysis module C24 may play a role in equalizing the signal.

Alternatively, or in addition to, the user interface on the test and measurement instrument, the user interface C34 on the test automation platform C30 may allow the user to configure the test and measurement instrument, as well as provide settings and other information for the test automation platform and the overall system. The test automation platform may comprise a piece of testing equipment or other computing device. While the platform may reside on a manufacturer's production line, no limitation to any particular location or use in any particular situation is intended nor should be implied. The test automation platform may also include one or more processors represented by C32 and a memory C36. As discussed in more detail further, the one or more processors C12 on the test and measurement device C10, and the one or more processors C32 on the test automation platform C30, may work in concert to distribute tasks, or one or the other device's processor(s) may perform all of the tasks. The machine learning network discussed below may take the form of one of these processors being configured to operate one or more of the machine learning networks.

Embodiments of the disclosure may comprise a configuration implemented into a standalone software application, referred to in the following discussion as "ML Tools." The test automation system operates a test automation application as the primary system controller in the loop. It sends operating, or tuning, parameters to the DUT and controls the temperature. In the instance of the DUT being an optical transceiver, the parameters comprise transmission parameters. This approach may be found as described above, and in U.S. patent application Ser. No. 17/701,186, "TRANSCEIVER TUNING USING MACHINE LEARNING," filed Mar. 22, 2022, incorporated here by reference in its entirety. The test automation application also synchronizes the instrument waveform acquisition with the transmission/operating parameter update. In addition, it provides the transmission/operating parameter values to the ML Tools software, and it reads next guess parameter values back from the neural network. The neural network estimates results based on the waveform acquired from the scope.

The machine learning assisted parameter tuning system has two modes of operation: training and runtime. During the training process, the test automation application sends a set of parameters to the DUT and acquires a resulting waveform. The user will be sweeping the parameters to allow the machine to learn what waveforms look like for all parameter settings. The test automation block then feeds a large set of waveforms and parameters to the ML Tools as datasets for training the machines, which also may be referred to as machine learning networks.

During runtime, the trained machines create an estimate for optimized equalization filter taps, usually Feed-Forward Equalization (FFE) taps for the waveform, and for creating an observed parameter set. Application of the FFE taps equalize the input waveform. The TDECQ computation process then uses the equalized waveform as an input. The TDECQ process will typically not use machine learning to obtain TDECQ, but rather computes it using existing measurement processes.

Figure 16:
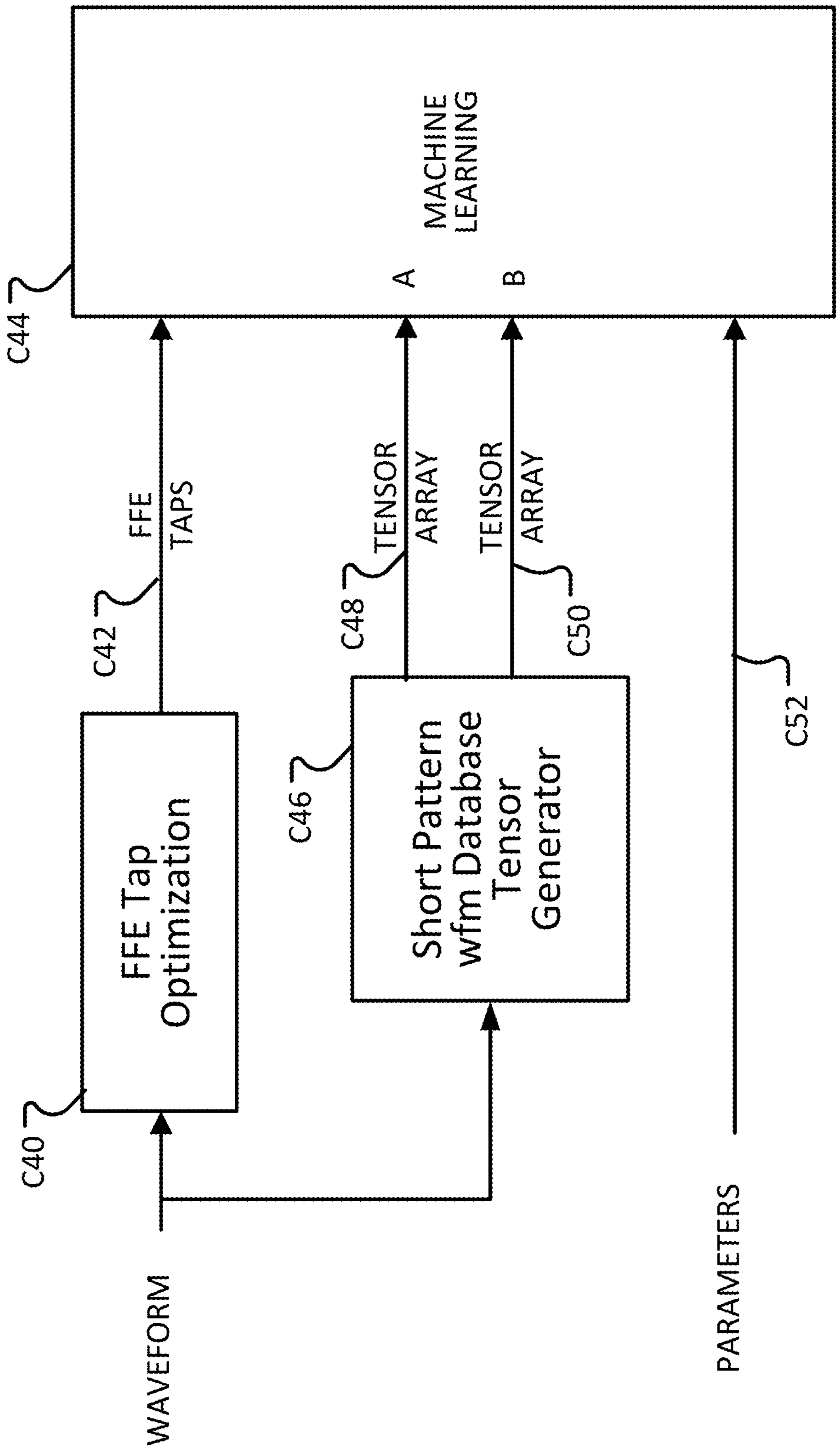
FIG. 16 shows an embodiment of training a single machine learning network within a test and measurement system.

FIG. 16 shows an embodiment of training of a single machine. The FFE tap optimization block C40 may use pre-existing software code to optimize and find the optimal FFE taps C42 for the training waveform to be sent to the machine learning network C44. In this embodiment, the training of the machine associates a waveform tensor array with parameters and with optimal FFE taps. The parameters C52 may be optical transmitter or other operating parameter values stored in the DUT from which the waveform was acquired. The tensor array may be as described in U.S. patent application Ser. No. 17/747,954, "SHORT PATTERN WAVEFORM DATABASE BASED MACHINE LEARNING FOR MEASUREMENT," filed May 18, 2022, and/or U.S. patent application Ser. No. 17/592,437, "EYE CLASSES SEPARATOR WITH OVERLAY, AND COMPOSITE, AND DYNAMIC EYE-TRIGGER FOR HUMANS AND MACHINE LEARNING," filed Feb. 3, 2022, the contents of which are hereby incorporated by reference. The short pattern waveform database tensor generator C46 generates one or more tensor arrays. In the embodiments here, the tensor generator generates two sets of tensor arrays C48 and C50. The term "tensor array" as used here means an array of tensor images. Tensor array C48 may comprise a tensor array, each tensor image in the array having one or more waveforms used in determining FFE taps for the TDECQ computation process discussed in the runtime operation below. Tensor array C50 may comprise a tensor array having one array of tensor images, each tensor image having three or more waveforms used in the tuning parameters process discussed in the runtime operation below. Each tensor image in the tensor array may also include a depiction of an environmental parameter to associate with the three or more waveforms, such as a bar graph representing the temperature at which the waveforms were acquired.

The TDECQ process will typically use existing methods for measuring TDECQ. It takes an input waveform and equalizes it with the optimized taps. It then performs the necessary steps internally to measure TDECQ and output that value. It returns that value to the test automation application for evaluation as to pass/fail.

Figure 17:
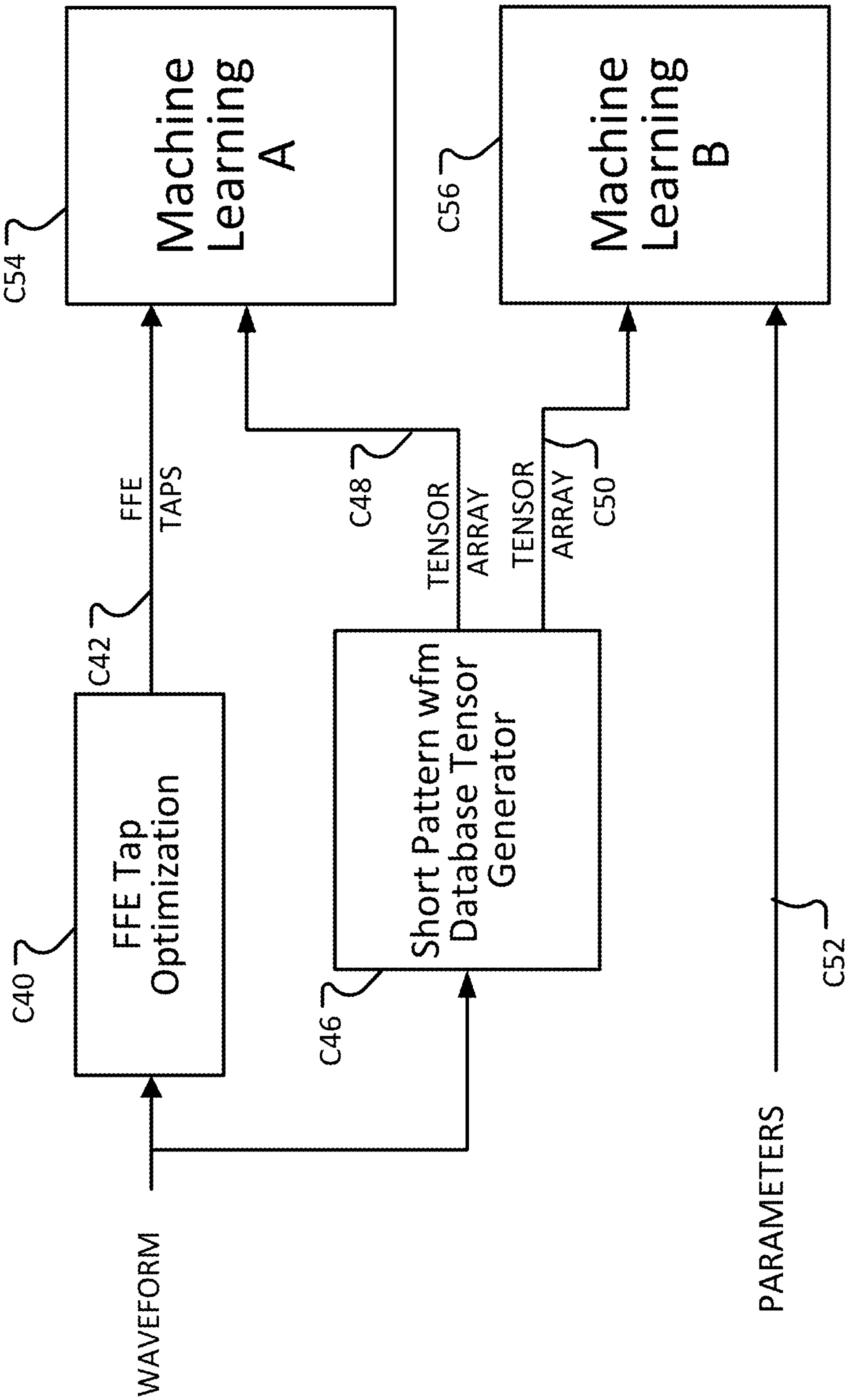
FIG. 17 shows an embodiment of training two machine learning networks within a test and measurement system.

FIG. 17 shows a similar training embodiment to that of FIG. 16. This embodiment has a machine A and a machine B. Machine A is dedicated specifically to associating the tensor array with the optimized FFE taps. Machine A C54 receives the optimized FFE taps C42 from the FFE tap optimization block C40 and a first tensor array C48 comprising one array of tensor images from the short pattern waveform tensor generator C46. The one array may have one waveform per tensor image in the array. Machine B C56 is dedicated specifically to associating parameters with the tensor array. Machine B receives a second tensor array C50 comprising one array of tensor images, each tensor in the array having three waveforms. Machine B also receives the operating parameters C52 associated with the waveforms used to generate the tensor array C50. The various components used in training have the identifier “training” to differentiate them from their runtime counterparts. The waveform comprises a “training waveform,” the FFE taps are the “training FFE taps,” etc.

Runtime has the objective to tune the optical transmitters, in this example, on a test automation platform. As discussed above, this may comprise a manufacturing test automation platform running on manufacturer’s production line. The test automation application controls the overall system, sets up the DUT with parameters, and sets up a test and measurement instrument to acquire the DUT waveform. The test automation application sends the waveform and parameters over to the tuning system. The system observes the waveform and determines if that set of parameters resulted in an optimal waveform that passes limits on the TDECQ value. If it does not, then the system feeds back a new set of parameters to the test automation application that loads them into the DUT for another try. DUTs that have values for TDECQ that are within the desired parameters pass and are considered optimized.

Figure 18:
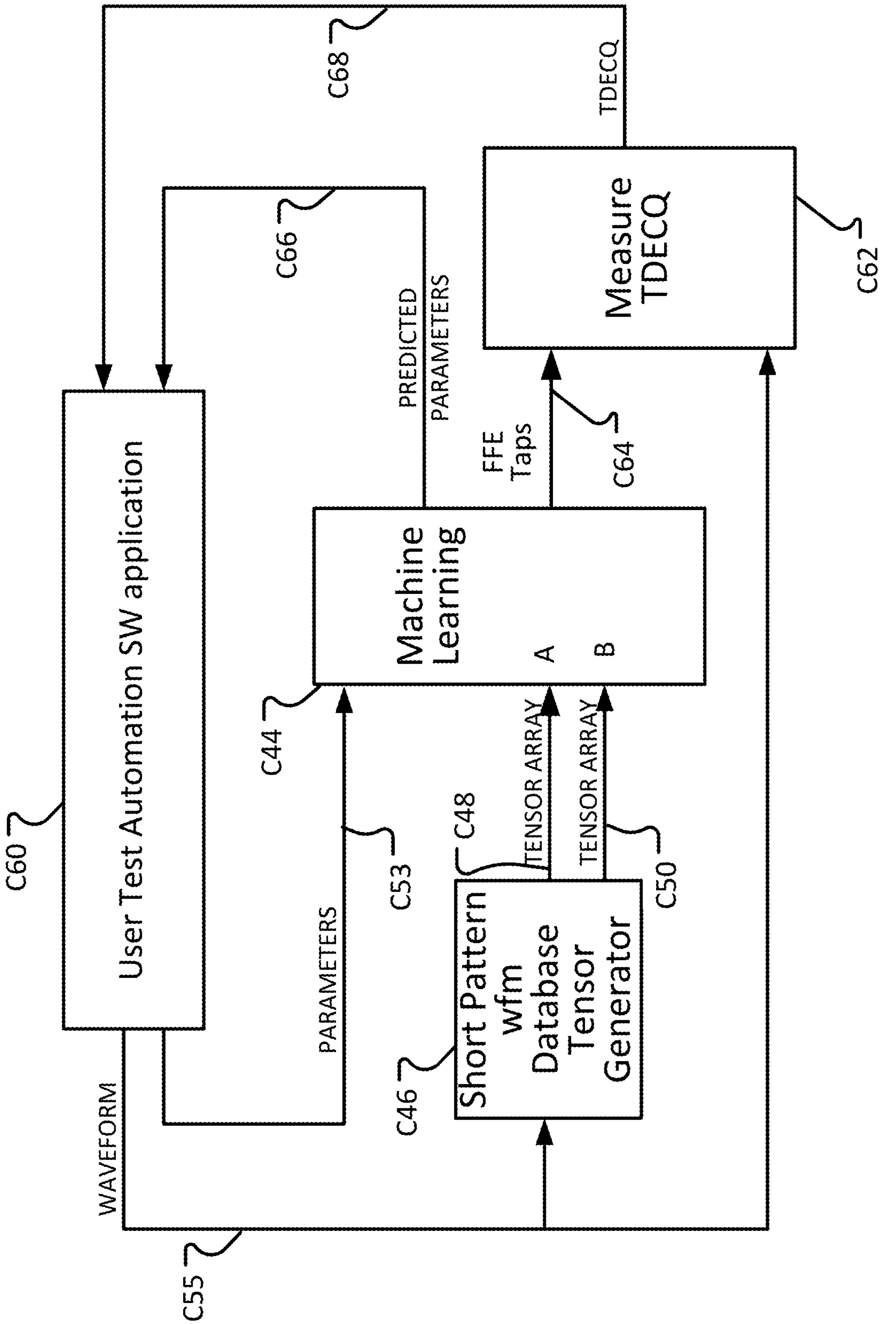
FIG. 18 shows an embodiment of performing TDECQ testing and providing tuning parameters using a single machine learning network within a test and measurement system.

FIG. 18 shows an embodiment of a runtime configuration using a single machine learning network. The test automation application C60 receives the waveform C55, for example, acquired from the DUT by the test and measurement instrument C10 in FIG. 15, and provides the waveform to the short pattern waveform database tensor generator C46 and to the TDECQ measurement process C62. The test automation application C60 also outputs a set of parameters C53 and sends them to the trained machine learning network C44. The machine learning network C44 receives the tensor arrays from the tensor generator C46. The machine learning network C44 uses the tensor array C50, having tensor images using three waveforms images to generate predicted parameters C66 and returns them to the test automation application. The machine learning network C44 may also use the parameters C53, which may include, for example, a temperature at which the waveform C55 was acquired, to generate the predicted parameters C66. Machine learning network C44 receives the tensor array C48 comprising a single array of tensor images, each tensor in the array using one waveform, and provides predicted FFE taps C64 to the TDECQ process C62. The TDECQ process uses the FFE taps C64 to equalize the waveform C55, computes the TDECQ value for the equalized waveform, and sends the TDECQ value C68 to the test automation application. If the TDECQ value meets the criteria, tuning finishes. If the TDECQ value does not pass, the test automation application uses the predicted parameters on the next testing iteration.

Figure 19:
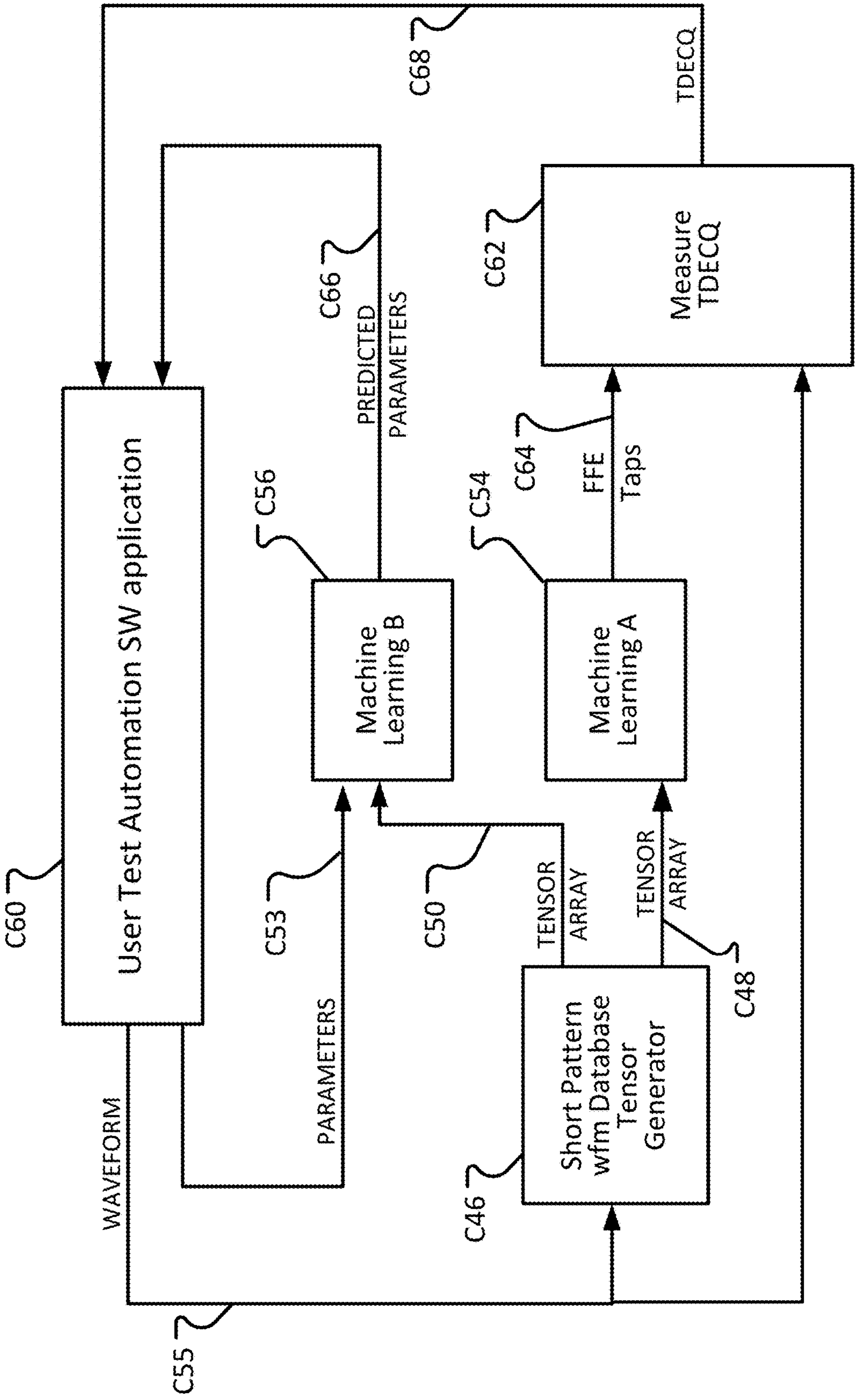
FIG. 19 shows an embodiment of performing TDECQ testing and providing tuning parameters using a two machine learning networks within a test and measurement system.

FIG. 19 shows an embodiment of a runtime configuration using two machine learning networks. Machine A C54 receives the tensor C48 and handles only the FFE taps C64 for the TDECQ process C62. Machine B C56 receives the tensor C50 and the parameters C53 and handles only the predicted parameters C66 as output.

An advantage of this system that combines TDECQ speed up and tuning parameter determination lies in the need for the waveform tensor generator to run only one time. Another advantage results from only needing one trained neural network for both TX tuning and TDECQ observation. This system offers a better-engineered design and a better user experience than using a separate third-party TDECQ measurement requiring separate training procedures for the tuning procedure and the TDECQ measurement.

Machine Learning for Taps to Accelerate TDECQ and Other Measurements

Machine learning techniques can significantly improve the speed of complex measurements such as Transmitter and Dispersion Eye Closure Quaternary (TDECQ) measurements, for example. The measurement speed improvements translate to the improvement of production throughput, for example on a manufacturing line. For the high-speed signal testing, the eye diagram of the signal has been used by machine learning to get measurement results. The full or partial pattern waveform are also used for machine learning for measurement. U.S. patent application Ser. No. 17/747,954, “SHORT PATTERN WAVEFORM DATABASE BASED MACHINE LEARNING FOR MEASUREMENT,” filed May 18, 2022 (referred to here as “Kan”), the contents of which are hereby incorporated by reference, describes an alternative technique of using a short pattern waveform database for machine learning for measurement. Based on the method described in Kan, the embodiments here describe a new method that uses the machine learning to speed up the most time consuming steps in measurements to reduce the overall measurement time.

One should note that the below discussion, for ease or understanding, focuses on 5-tap feed-forward equalizers (FFE), but the techniques described here apply to optimization of any number of equalizer, or filter, taps, for any type of equalizer. Similarly, while the performance measurement used in the below discussion comprises TDECQ measurement, any performance measurement made on equalized waveforms could benefit from application of the embodiments here. The term “equalized waveform” as used here means a waveform after application of an equalizer.

The embodiments here include a test and measurement instrument, such as an oscilloscope used in testing a device under test (DUT). One example discussed below involves a process for testing DUTs comprising optical transceivers or transmitters, with the understanding that the embodiments may apply to any DUT that generates a signal.

Figure 20:
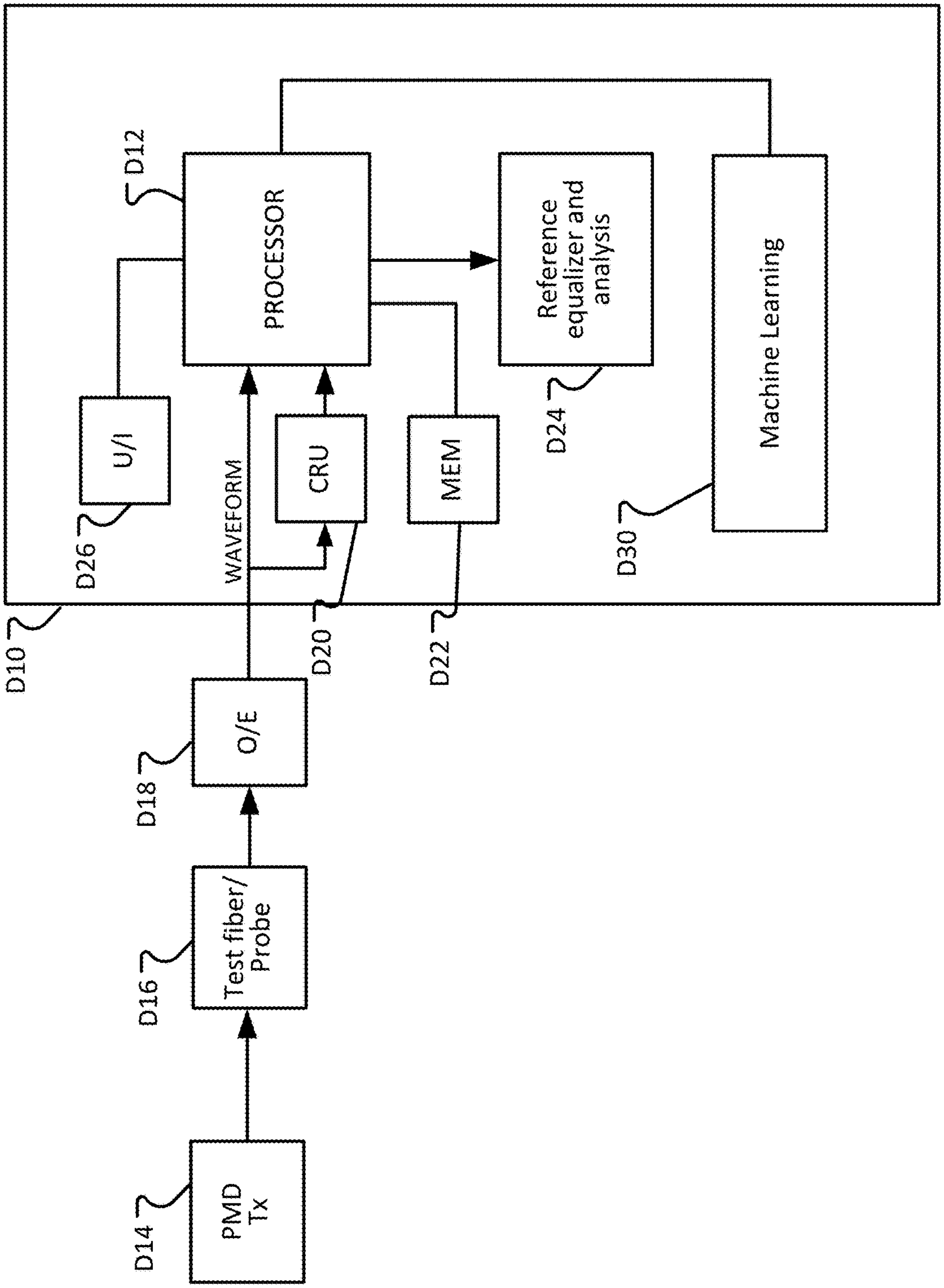
FIG. 20 shows an embodiment of a test and measurement instrument.

FIG. 20 shows an embodiment of a testing setup in the instance of an optical transmitter D14 as a DUT. The testing setup includes a test and measurement system that may include a test and measurement instrument such as an oscilloscope D10. The test and measurement instrument D10 receives, at an input, a signal from the DUT D14, typically through an instrument probe D16. In the case of an optical transmitter, the probe will typically comprise a test fiber coupled to an optical to electrical converter D18 that provides a signal to the test and measurement instrument. The signal is sampled and digitized by the instrument to become an acquired waveform. A clock recovery unit (CRU) D20 may recover the clock signal from the data signal, if the test and measurement instrument D10 comprises a sampling oscilloscope for example. The test and measurement instrument has one or more processors represented by processor D12, a memory D22 and a user interface D26. The memory may store executable instructions in the form of code that, when executed by the processor, causes the processor to perform tasks. The memory may also store one or more acquired waveforms. The user interface D26 of the test and measurement instrument allows a user to interact with the instrument D10, such as to input settings, configure tests, etc. The test and measurement instrument may also include a reference equalizer and analysis module D24.

The embodiments here employ machine learning in the form of a machine learning network D30, such a deep learning network. The machine learning network may include a processor that has been programmed with the machine learning network as either part of the test and measurement instrument, or to which the test and measurement instrument has access. As test equipment capabilities and processors evolve, the processor D12 may include both.

Figure 21:
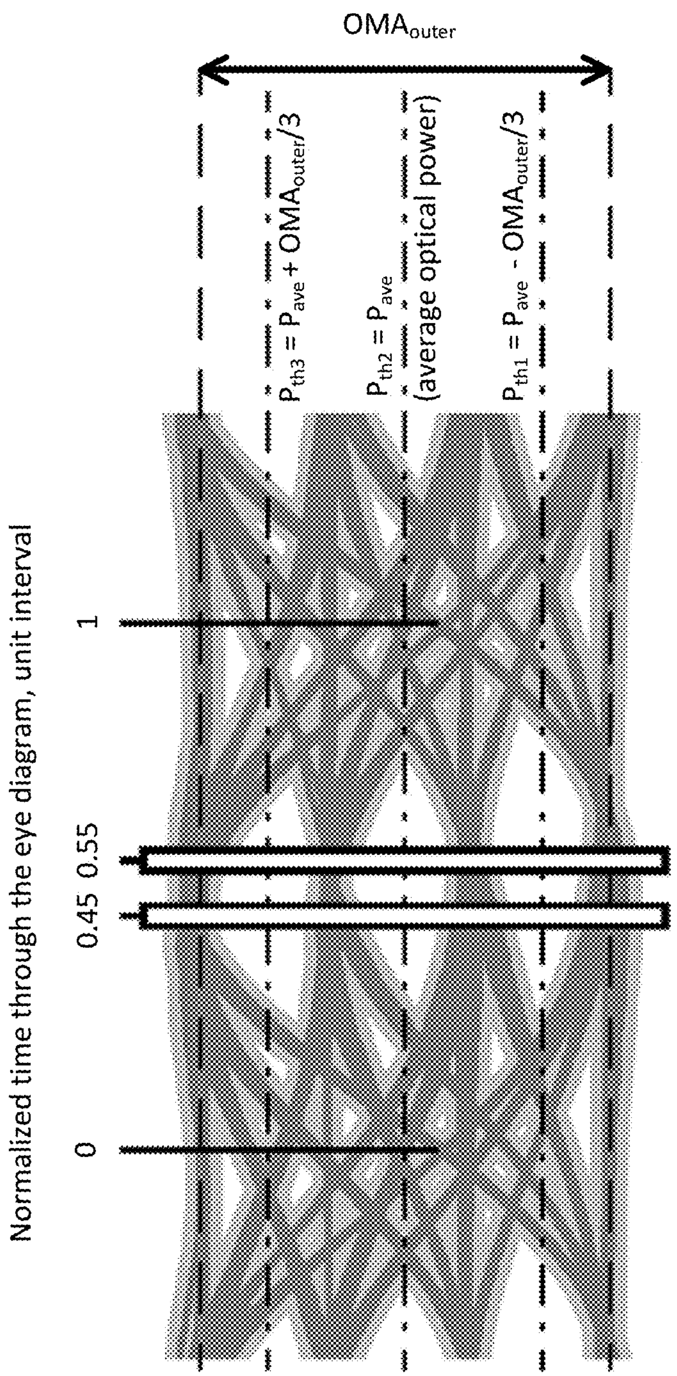
FIG. 21 shows an illustration of a transmitter and dispersion eye closure quaternary (TDECQ) measurement.

As discussed above, the complex measurement example employing an equalizer comprises the TDECQ measurement using an FFE with five taps. FIG. 21 shows an illustration of a TDECQ measurement. This diagram results from a 5-tap feed forward equalizer (FFE) with one unit interval (1 UI) tap spacing optimized to minimize the TDECQ value.

TDECQ value is computed with the following formula:

$$TDECQ = 10\log_{10}\left(\frac{OMA_{outer}}{6\times Q_r\times\sqrt{\sigma_G^2+\sigma_S^2}}\right)$$

Where $OMA_{outer}$ is related to the power of the optical signal. $Q_r$ is a constant value.

$$\sigma_G^2$$

is the standard deviation of a weighted Gaussian noise that can be added to the eye diagram shown in FIG. 21 and still get the larger of symbol error ratio at the two vertical slicers with 0.1 UI apart is 4.8e–4. The value of $\sigma_S$ is the scope or instrument noise recorded when no signal is fed into the O/E module.

Figure 22:
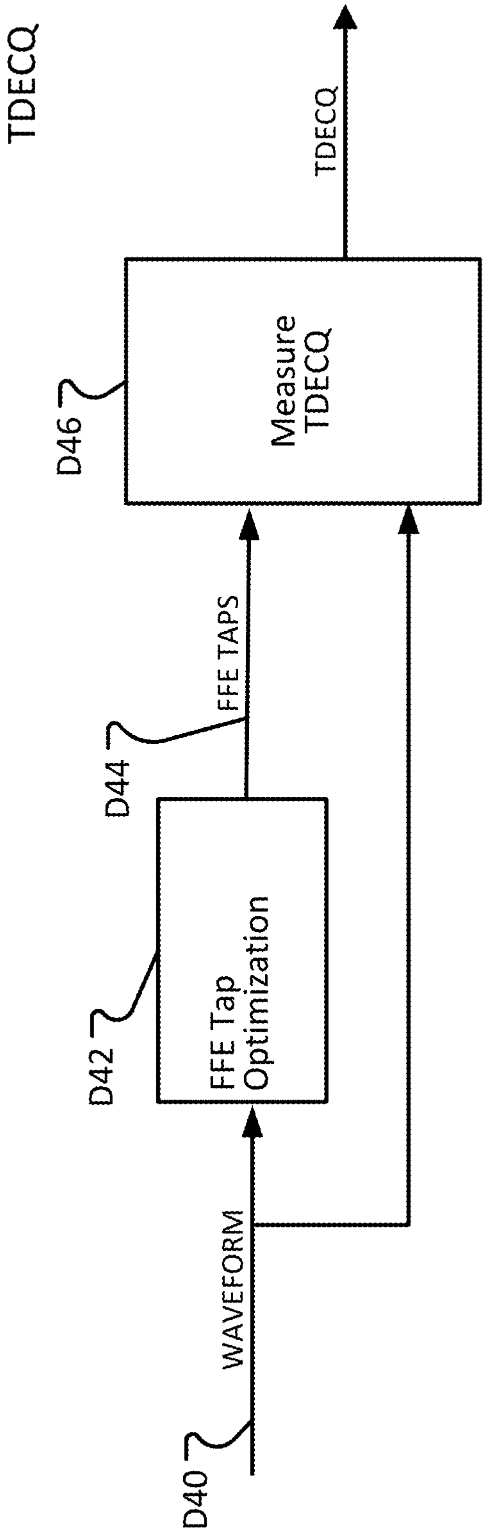
FIG. 22 shows an example of a process for optimizing FFE taps for a performance measurement.

A single TDECQ measurement on the compliance pattern SSPRQ (short stress pattern random quaternary) takes seconds to complete using conventional methods. The most time-consuming step in the measurement is the FFE tap adaption. The IEEE specification explicitly defines the process to calculate the TDECQ value with the FFE taps. FIG. 22 shows a block diagram of this process.

Figure 23:
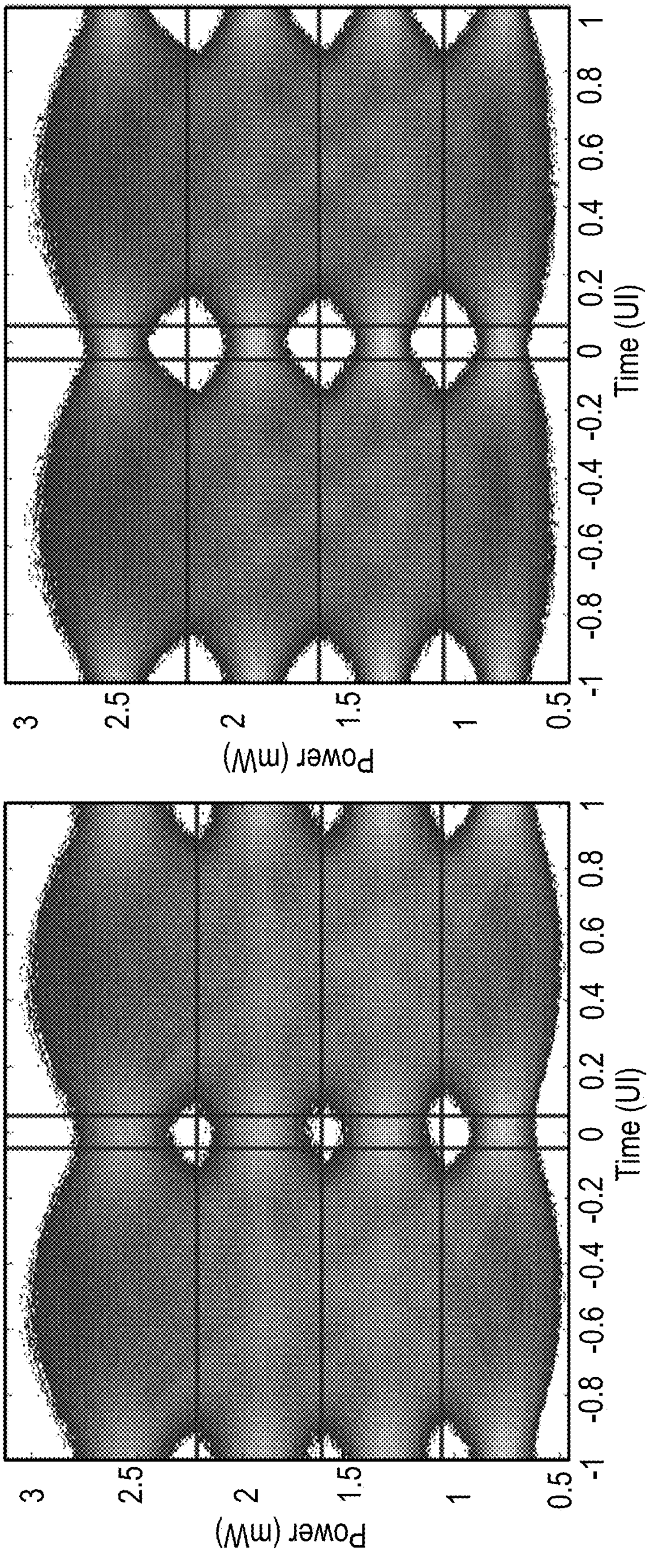
FIG. 23 shows examples of eye diagrams before and after FFE.
Figure 24:
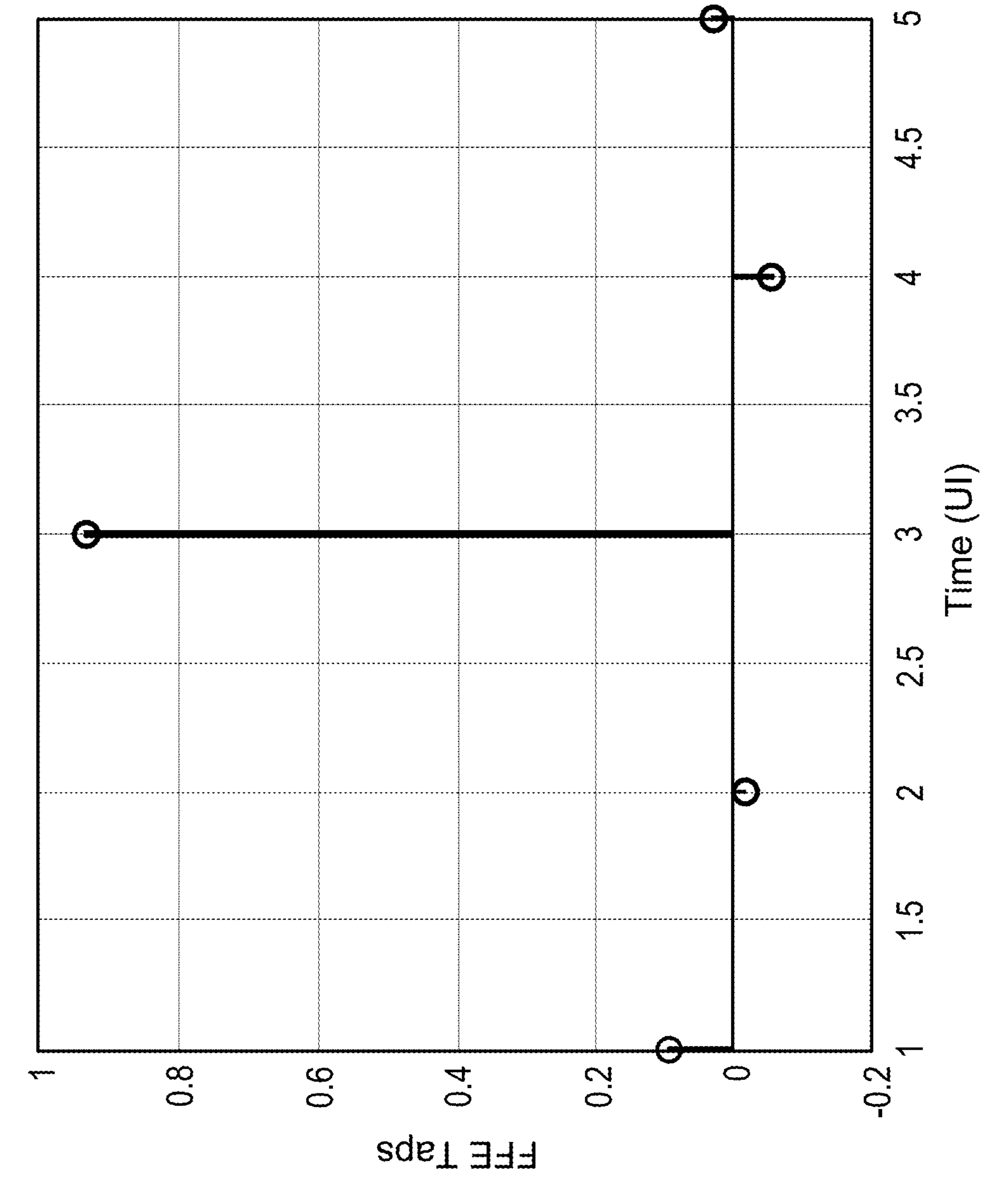
FIG. 24 shows a graphical representation of output FFE taps.

The test and measurement instrument having one or more processors receives the waveform D40 and optimizes the FFE tap values at D42 to produce optimized FFE taps D44. This process may employ one of many different methods of determining the optimized taps. The resulting taps improve the eye diagram as shown in FIG. 23. FIG. 23 shows the eye diagram before the FFE on the left and after the FFE on the right. The eye diagram after FFE has a larger eye opening. FIG. 24 shows a graphical representation of the FFE taps.

Returning to FIG. 22, the measurement process D46 applies the optimized taps to the waveform and performs the measurement at D46 in one of many conventional ways. As mentioned above, the measurement could be any measurement based upon a performance requirement, such as a range or specific value for the measurement like the TDECQ value. The measurement value will determine if the DUT meets the performance requirement or fails.

The overall TDECQ measurement on the compliance pattern SSPRQ (short stress pattern random quaternary) can take seconds to complete for each DUT. In the case of a manufacturing line testing tens of thousands of optical transceivers as DUTs, reducing this time has a massive effect on production speeds. As discussed above, the optimization of the taps for a particular waveform takes up the most time of the overall measurement. Therefore, reducing the optimization time will speed up production and lower costs.

Figure 25:
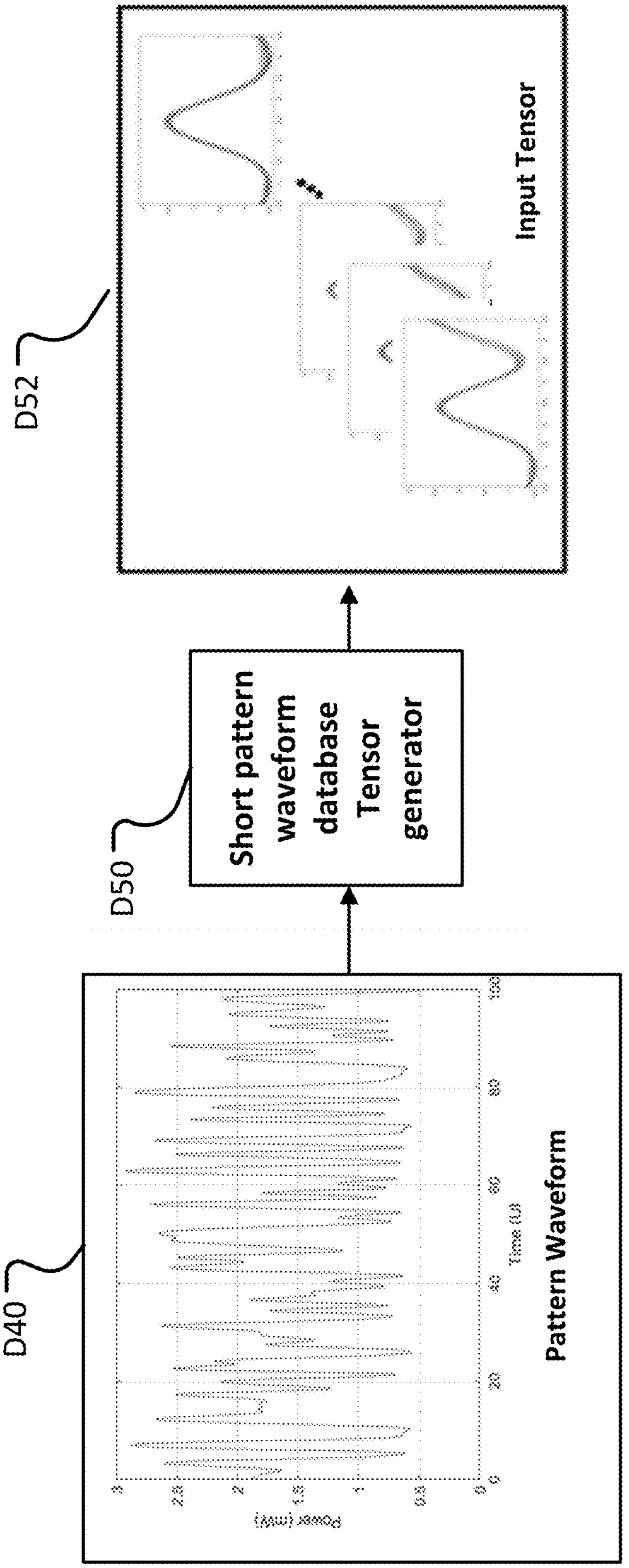
FIG. 25 shows an embodiment of a method of generating tensors from a waveform.

The embodiments here use the machine learning network to determine the FFE taps for the waveform and reduce the time to less than a second per DUT. One aspect of this approach uses the short pattern waveform database tensor generator discussed in "Kan" referenced above. FIG. 25 shows an embodiment of that process. The waveform D40 received from the DUT is converted into an array of tensor images, also referred to as a tensor array, by the generator D50. It creates an array of 2D histogram images that cover short lengths or portions of the waveform pattern. Each element of the array of tensors is a different image containing an overlay of multiple instances of a particular short pattern in the waveform D40. The pattern is different for each tensor in the array. For example, one element of the tensor array may be an overlaid image of all instances in the waveform D40 of the short 3-symbol-length pattern of symbols 0, 1, 0, another element of the tensor array may be an overlaid image of all instances in the waveform D40 of the short 3-symbol-length pattern of symbols 0, 2, 0, and so on. FIG. 25 also shows an example of a resulting tensor array D52.

Figure 26:
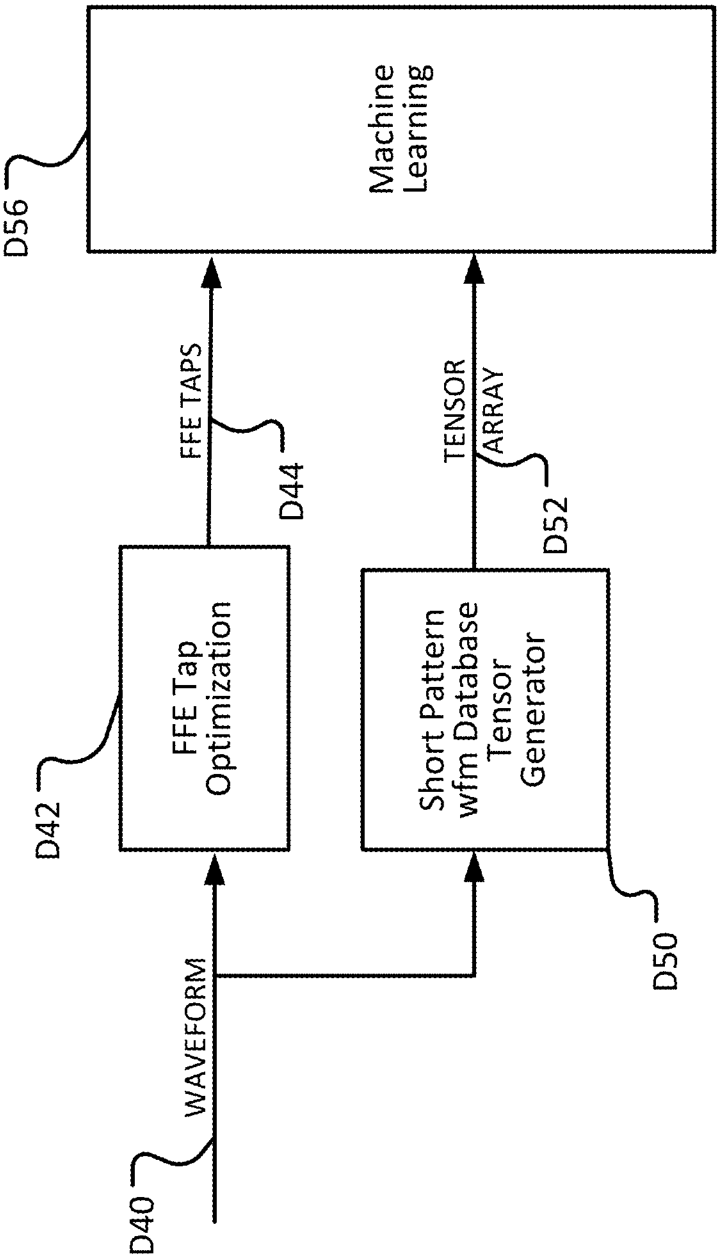
FIG. 26 shows an embodiment of a method of training a machine learning network to perform FFE tap optimization.

The process obtains optimized FFE taps for each pattern waveform as shown in FIG. 26. The optimized FFE taps are associated with the input tensors as they come from the same pattern waveforms. The input tensors and the corresponding FFE taps as labels become training data to be fed to the machine learning network D56. The incoming waveform D40 undergoes FFE tap optimization at D42 using any existing method to produce training FFE taps D44 for that waveform. The short pattern waveform database tensor generator D50 produces a training tensor array D52. These are then sent to the machine learning network D56 to train the network to produce optimized filter tap values based upon a tensor array input.

Figure 27:
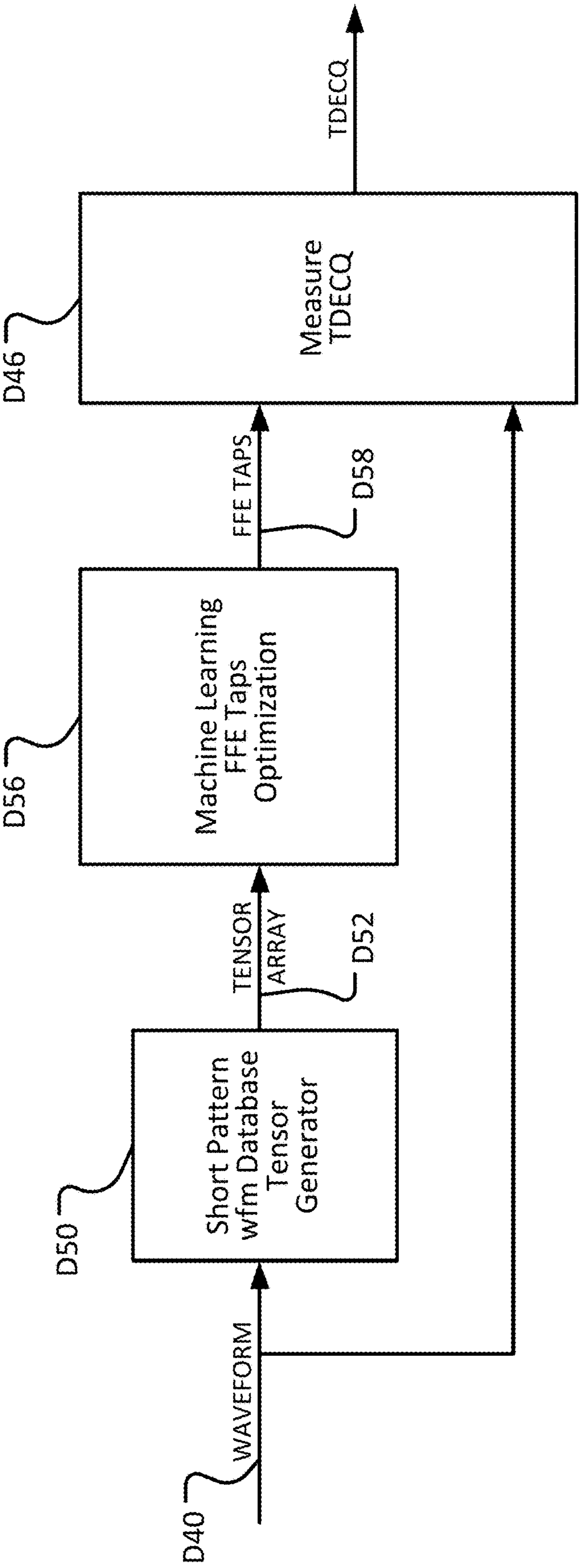
FIG. 27 shows an embodiment of a method of using machine learning to provide optimized FFE taps for a complex measurement.

Once the machine learning network has undergone training, it can produce optimized filter tap values much more quickly than conventional methods. FIG. 27 shows an embodiment of a runtime process. The waveform D40 undergoes tensor array generation at the generator D50. The trained machine learning network D56 receives the tensor array D52 and uses it to produce the predicted optimized taps at D58. These taps differ from the previous FFE taps used during training, as discussed above, because they result from the machine learning system, not from conventional methods. The FFE taps are then applied to the waveform and the TDECQ measurement is made by the measurement module D46.

Using machine learning to speed up FFE, DFE and other equalizer adaptions have been explored recently. The embodiments here use different inputs and the output from the machine learning is then used to get the measurement results. The example, as shown in FIG. 27 involves TDECQ measurement, but the same approach can be applied to other measurements, as discussed above.

Tuning a Device Under Test Using Parallel Pipeline Machine Learning Assistance

Embodiments of the disclosure address issues in reducing temperature cycle time in testing DUTs, combined with a machine learning (ML) system to speed up the overall time to test DUTs. The following discussion will use the example of DUTs being an optical transmitters or transceivers that need parameters to be tuned at multiple different temperatures. The embodiments generally provide systems and methods in which the total tuning time only depends on one scope channel and the amount of time machine learning takes per transmitter. These systems and methods then result in the ability to output a fully tuned transmitter, tuned at multiple temperatures. In one embodiment, a system using three temperatures can run at an uninterrupted rate of 36 seconds for each transmitter. This represents a two hundred times speed up of the two-hour tuning time for the worst-case example of conventional tuning processes.

Embodiments of the disclosure use novel techniques for pipelining the processing of data, use a novel machine learning element, and use novel techniques for using the serial sequencing of a different instrument, such as an oscilloscope ("scope"), channel for a different temperature chamber, or oven. Embodiments of the disclosure generally do not parallelize the scope channel acquisitions between channels to obtain the 200× speed up factor. Rather, embodiments of the disclosure generally process the channels serially one channel at a time. This avoids the very expensive and time-consuming process of redesigning oscilloscope hardware and software to accommodate parallel channel processing because parallel channel processing is not needed. Another advantage of the overall test configuration is that it minimizes the layers of optical, or other, switches needed in the signal path between the DUT and the scope to be only one layer. This offers an advantage of reducing costs and improving signal integrity compared to trying to process four waveforms input in parallel into four scope channels at the same time as some current manufacturing systems do.

The embodiments employ a parallel pipeline architecture. The number of pipelines equals the number of ovens, or temperature chambers, used. The number of pipelines also corresponds to the number of switches connected to the DUTs in each oven to cycle through the DUTs, the dimensions of the switch that selects between the switches connected to each oven, and the number of scope or test instrument channels. Another dimension is the number of DUTs per oven. Each of the oven DUT switches, those that connect to the DUTs in the oven, will have a number of switches equal to the number of DUTs in the oven.

The following discussion uses a particular number of ovens, DUT switches, a particular dimension of the instrument switch, and a particular number of channels on a test and measurement instrument. These numbers are for ease of discussion and understanding and are in no way intended to limit the number of any component in the system.

Figure 28:
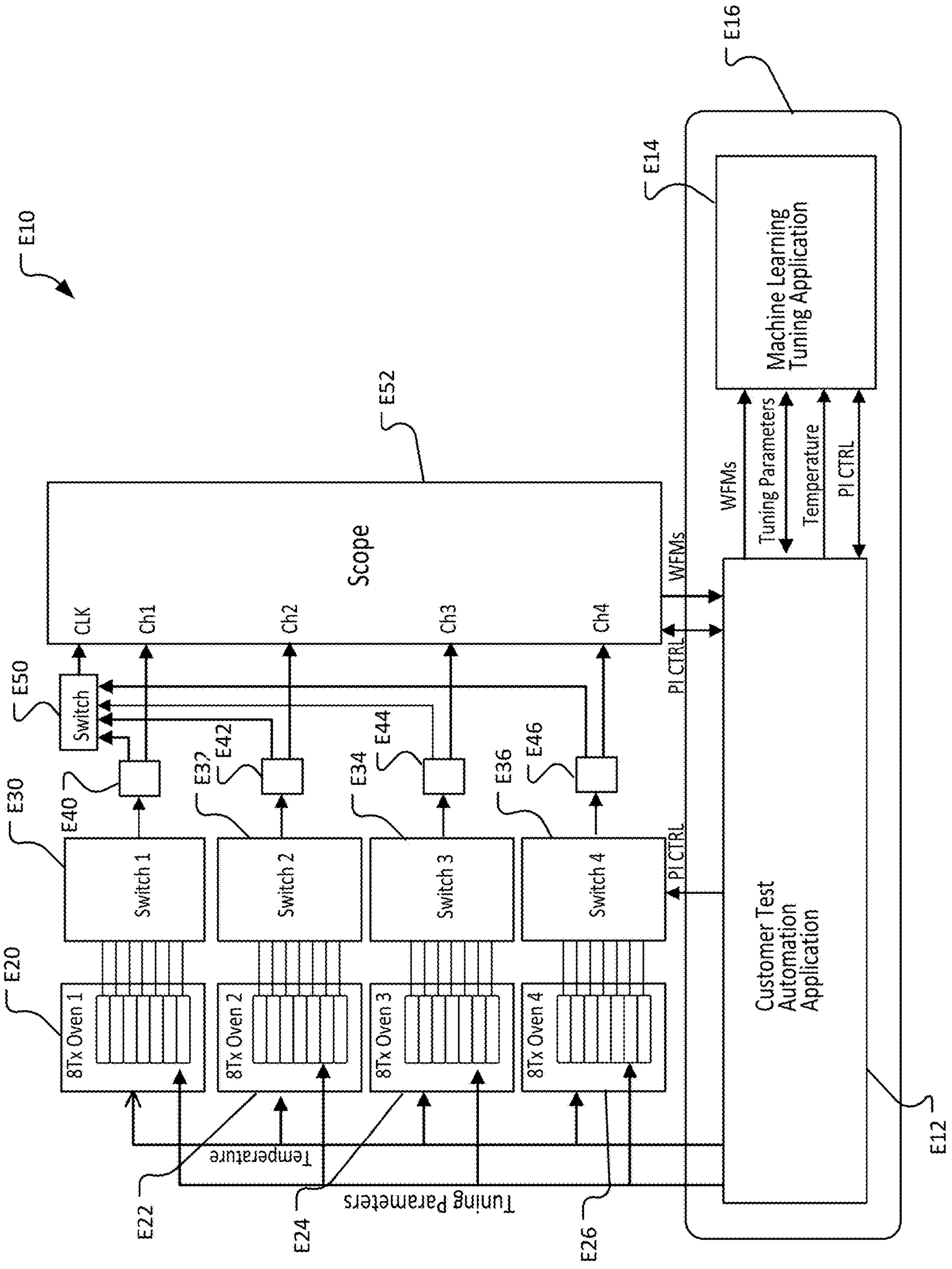
FIG. 28 shows an embodiment of a test system using pipelining.

The embodiment of FIG. 28 shows a pipeline system E10 under the control of a customer test automation application E12 and a machine learning system E14. These may both reside on the same computing device E16, which may have one or more processors, or may be distributed among multiple computing devices each with one or more processors. The customer test automation application E12 may control the switches through a programmatic interface (PI). Similarly, the test automation application may interact with the instrument and the machine learning system also through a programmatic interface.

One example embodiment uses four ovens, E20, E22, E24 and E26. This translates to four pipelines, four DUT switches, E30, E32, E34, and E36, and a 4×1 instrument switch E50 that connects each DUT switch to the scope clock input, CLK. The Tx, transmitter, must be tuned for three or more temperatures, and each temperature takes 180 seconds to ramp up. To take advantage of the parallel architecture, the embodiments of the disclosure overlap the ramp up times of the temperature change in each oven. The end result is the oven ramp-up times go to a virtual time of zero seconds in the overall tuning process timeline for system 10. Likewise, the time to take transmitters in and out of the oven also goes to virtually zero seconds. Each pipeline also contains serial operation tasks.

In the embodiment, each oven contains eight transmitters to be brought up to temperature. The DUTs in this embodiment comprise optical transmitters, but any type of tunable DUT, optical or electronic may use this system. "Electronic" DUTs are those DUTs that are not optical devices. Having eight transmitters per oven results in each DUT switch E30, E32, E34, and E36 being 8×1 switches. In the case of optical transmitters, these are optical switches.

Even though the eight transmitters in one oven are heated in parallel, they shall be tuned one at a time serially into one instrument channel. This avoids costly redesigns of the instrument to allow for parallel processing of all channels.

Each DUT switch may connect to a splitter that splits the signal between the instrument switch E50 and the channel on the instrument E52. The splitters E40, E42, E44, and E46, pick off some of the signal from each of four DUT switch outputs to be applied to the 4×1 instrument switch that outputs into the CLK input of the sampling scope. This is for the purpose of clock recovery for the scope to acquire the signal on each channel.

The instrument switch E50 selects the appropriate 8×1 DUT switch output to tune the transmitters in the oven that has completed ramping up to the correct temperatures. The selected 8×1 DUT switch will cycle through all the transmitters in the oven.

In operation, the test and measurement instrument acquires the waveforms from the transmitters. One of the aspects of this system is that only one channel is processed at a time in serial fashion. The channels are not processed in parallel. This is because only one channel at a time will be connected to DUTs that are ramped up to the correct temperature. For example, when oven 20 is up to temperature then channel 1 will acquire waveforms from each of the 8 transmitters in series in that oven at that temperature. The user test automation application E12 will pass these waveforms to the Tektronix Optical Tuning application E14 for training the deep learning network and for predicting optimal tuning parameters and for computing TDECQ validation of the resulting tuning. This means that the time to tune a transmitter depends only on the acquisition time of the oscilloscope, and on the DSP processing time of the optical tuning applications. The Tektronix Optical Tuning application, or machine learning system, uses machine learning to provide tuning parameters for the optical transceivers based upon the waveforms received from the DUTs.

The customer application E12 acts as the primary controller of the overall system. It has responsibility for timing and sequencing of all the tasks for all four of the parallel pipelines. These tasks include setting the temperatures of the ovens. The controller may pause while an operator or robot loads and unloads transmitters into and out of the oven and may control the robot if one is used. The tasks also include loading tuning parameters into the transmitters and controlling an oscilloscope to acquire waveforms from the transmitters. The controller also collects the waveforms and the parameters and sends them to the Optical Tuning Application to train deep learning networks, to receive back predictions of optimal tuning parameters, and to receive measurements on the waveforms for validation of tuning. The control of the system is embodied in one or more processors configured to execute code to operate the various aspects of the system. The one or more processors may be located on the test automation application E12 running on a separate computing device from the instrument and the machine learning system. Each of those may have their own processors, they may all be contained in one system, or any mix in between.

The controller also controls the 8×1 DUT switches E30-E36 to select from which transmitter in an oven to collect a waveform, and controls the 4×1 instrument switch E50 to select the correct output of the 8×1 switches to apply into the clock recovery input CLK of the scope. The controller also controls the instrument E52 to acquire the waveforms from the correct channel of the instrument depending on which channel has an oven that is currently ramped up to the temperature for the tuning operation. As will be seen with reference to FIG. 29, an unused period of time, in this embodiment 96 seconds, exists between the ramp up of the temperature of each oven and the tuning interval for the transmitters in that oven at that temperature.

As mentioned above, the tuning process employs a novel machine learning system that undergoes training to associate a set of tuning parameters for each DUT based upon the waveforms. The process may iterate until the DUTs have been determined to either pass or fail. The machine learning system accelerates the cycle of tuning the DUTs and then testing them to determine operational pass or fail. The testing process involves a measurement process that also relies upon the machine learning system. This system has demonstrated that it reduces the tuning interval to 12 seconds per transmitter per temperature. With the ramp up time period for each oven essentially reduced to zero, the system can achieve a tuning interval of 36 seconds per transmitter across three temperatures.

Figure 29:
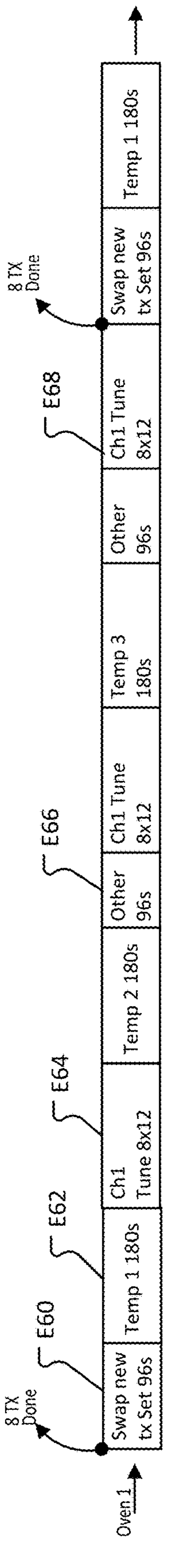
FIG. 29 shows a pipeline diagram for an embodiment of a test system.
Figure 30:
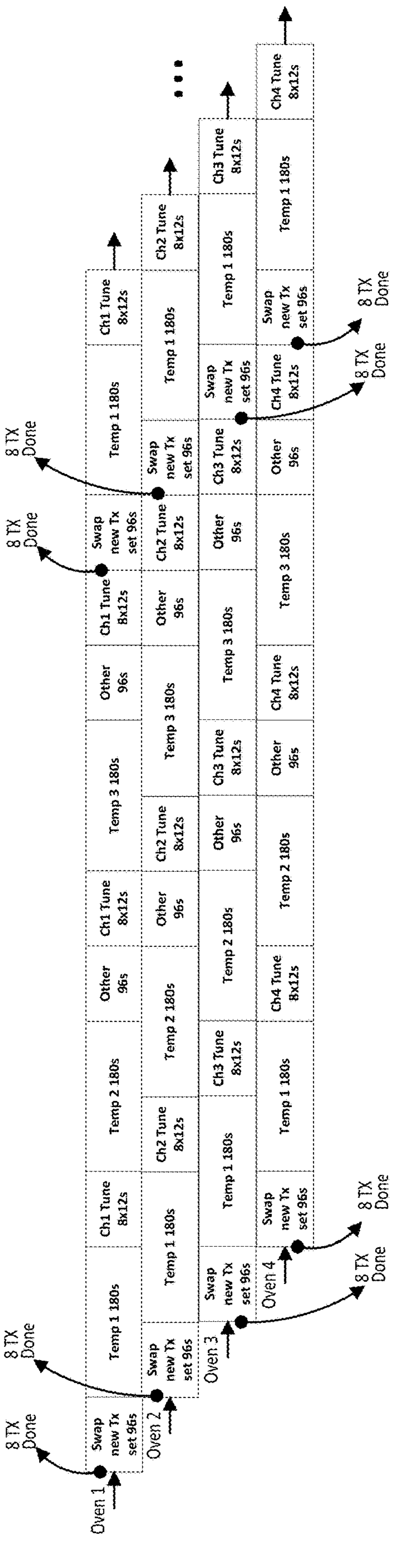
FIG. 30 shows how four pipelines are aligned in timing.

FIG. 29 shows one of the pipelines, and FIG. 30 shows the four parallel pipelines, each sourced by an oven. In FIG. 29, Oven 1, having tuned a set of transmitters, receives a new set at E60. At E62, the oven ramps up to the first temperature, which takes 180 seconds. The transmitters then undergo tuning and testing using the machine learning system at E64, which takes 12 seconds per transmitter, or 96 seconds for the set of 8 to be tested at that temperature. Upon completion of tuning and testing, the oven then ramps up to the second temperature. There is an unused time interval of 96 seconds at E66. The process then continues with tuning and testing, ramping up to the third temperature, another unused time interval of 96 seconds, then the final tuning and testing at E68. FIG. 29 only shows a view of one oven and one pipeline. The efficiency and advantages of the pipelining approach result from combining multiple pipelines as shown in FIG. 30.

In FIG. 30, one can see that the four ovens source the parallel pipelines. The top pipeline is the pipeline shown in FIG. 29. More pipelines could be added with the addition of more ovens. The process loads the second oven upon completion of the loading of the first oven. As stated above, the tuning time for each transmitter takes 12 seconds. This breaks down as 2 seconds per acquisition for four waveforms, 1 second for the machine learning DSP to predict tuning parameters, 2 seconds to compute TDECQ (transmitter dispersion eye closure quaternary) the measurement used to determine pass/fail, and a 1 second margin for a total of 12 seconds per transmitter. Each testing and tuning block computes while the other three ovens are in different phases of ramping up to temperature, or having a set of DUTs unloaded or loaded.

After each testing and tuning block there is another block for that pipeline to ramp up to the next temperature. After each pipeline has computed tuning for each temperature then the 8 transmitters in that oven are ready to unload, and a new set of 8 transmitters are loaded to repeat the cycle. The unused time intervals allow for the system to perform other operations that may not be covered by the optical tuning algorithm. The pipeline sequencing times may be adjusted if needed.

The parallel pipelines as shown in FIG. 30 provide the system to output fully tuned transmitters at an average ideal rate of one transmitter every 36 seconds. The tune times given represent the ideal, assuming machine learning predictions are 100% accurate. The 96 seconds overlap margins can cover some or all of any inaccuracy. Even with these built in intervals, the actual result is still expected to be many times faster than current methods used on the manufacturing lines.

As discussed above, the embodiments may have been discussed with regard to tuning optical transmitters, but the pipelining architecture and temperature testing could be applied to many different types of DUTs, optical or electronic.

In this manner, the embodiments pair the optical tuning machine learning systems mentioned with the novel parallel pipeline and instrument channel switching architecture to make the cycle times of the ovens go to virtual zero. This results in a machine learning assisted speed up of predicting optimized tuning parameters. The embodiments achieve this tuning speed improvement of almost two hundred times, without the need to use parallel instrument acquisition channels.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the disclosed technologies are provided below. An embodiment of the technologies may include one or more, and any combination of, the examples described below.

Example A1 is a test and measurement system, comprising: a test and measurement device; a connection to allow the test and measurement device to connect to an optical transceiver; and one or more processors, configured to execute code that causes the one or more processors to: set operating parameters for the optical transceiver to reference operating parameters; acquire a waveform from the optical transceiver; repeatedly execute the code to cause the one or more processors to set operating parameters and acquire a waveform, for each of a predetermined number of sets of reference operating parameters; build one or more tensors from the acquired waveforms; send the one or more tensors to a machine learning system to obtain a set of predicted operating parameters; set the operating parameters for the optical transceiver to the predicted operating parameters; and test the optical transceiver using the predicted operating parameters.

Example A2 is the test and measurement system of Example A1, wherein the one or more processors are further configured to cause the one or more processors to repeat the execution of the code for each temperature setting in a range of temperatures settings.

Example A3 is the test and measurement system of Examples A1 or A2, wherein the one or more processors are distributed among the test and measurement device, a test automation system and a machine learning system separate from the test and measurement device.

Example A4 is the test and measurement system of any of Examples A1 through A3, wherein the machine learning system comprises a plurality of neural networks, one or more to produce the predicting operating parameters, one to produce a predicted measurement value, and one to produce a set of optimized feed-forward equalization filter tap values.

Example A5 is the test and measurement system of any of Examples A1 through A4, wherein the predetermined number of sets of reference parameters is three, one set of average values for the parameters, one set having values higher than the average values, and one set having values lower than the average values.

Example A6 is the test and measurement system of any of Examples A1 through A5, wherein the one or more processors are further configured to execute code to cause the one or more processors to apply an inverse normalization to the predicted operating parameters.

Example A7 is a method to tune optical transceivers, comprising: connecting the optical transceiver to a test and measurement device; setting operating parameters for tuning the transceiver to reference operating parameters; acquiring a waveform from the optical transceiver; repeating the setting operating parameters and acquiring a waveform, for each of a predetermined number of sets of reference operating parameters; building one or more tensors from the acquired waveforms; sending the one or more tensors to a machine learning system to obtain a set of predicted operating parameters; setting the operating parameters for tuning the optical transceiver to the predicted operating parameters; and validating the predicted operating parameters.

Example A8 is the method of Example A7, further comprising repeating the method for each temperature in a range of temperatures.

Example A9 is the method of Examples A7 or A8, wherein building one or more tensors comprises building a levels tensor, an impulse tensor, and a combined tensor.

Example A10 is the method of any of Examples A7 through A9, wherein building a combined tensor comprises building an image having three or more channels.

Example A11 is the method of Example A10, wherein the image includes a bar graph image representing at least one of a temperature value and a noise value.

Example A12 is the method of any of Examples A7 through A11, further comprising generating reference operating parameters, comprising: tuning a plurality of optical transceivers at a plurality of temperatures; generating a histogram of each tuning parameter, at each temperature, for the plurality of tuned optical transceivers; calculating a mean reference parameter set by averaging values for each parameter in the histograms; increasing values in the mean parameter set to create a first delta reference parameter set; and decreasing values in the mean parameter set to create a second delta reference parameter set.

Example A13 is the method as any of Examples A7 through A13, wherein building one or more tensors comprises building a tensor having three channels, one channel for a mean reference tensor, one channel for a first delta tensor, and one channel for a second delta tensor.

Example A14 is the method of any of Examples A7 through A13, wherein sending the one or more tensors to a machine learning system comprises: sending the one or more tensors to two neural networks in the machine learning system to obtain optimized operating parameters; sending an impulse tensor to a third neural network to obtain optimized feed-forward equalization filter taps; and sending a combined tensor to a fourth neural network to obtain a predicted transmitter and dispersion eye closure penalty quaternary (TDECQ) measurement.

Example A15 is the method of any of Examples A7 through A14, wherein validating the predicted operating parameters comprises measuring the output of the transceiver and determining if the output is within a predetermined range.

Example A16 is the method of any of Examples A7 through A15, further comprising applying an inverse normalization to the predicted operating parameters.

Example A17 is a method of training a machine learning system for tuning optical transceivers, comprising: creating a predetermined number of sets of reference operating parameters; repeating, for each set of reference operating parameters: setting the operating parameters for the optical transceiver to a set of reference operating parameters; acquiring a waveform from the optical transceiver; tuning the optical transceiver to meet a desired output; and performing transmitter dispersion eye closure quaternary (TDECQ) analysis on the waveform; providing results of the analysis and the waveforms to a tensor builder; sending one or more tensors to one or more neural networks with the associated waveforms and reference operating parameters; and repeating the method until a sufficient number of transmitters have been tuned.

Example A18 is the method of Example A17, wherein creating the predetermined number of sets of reference operating parameters comprises: tuning a plurality of optical transceivers at a plurality of temperatures; generating a histogram of each parameter, at each temperature, for the plurality of tuned optical transceivers; calculating a mean reference parameter set by averaging values for each parameter in the histograms; increasing values in the mean parameter set to create a first delta reference parameter set; and decreasing values in the mean parameter set to create a second delta reference parameter set.

Example A19 is the method of Examples A17 or A18, further comprising normalizing the reference parameters.

Example A20 is the method of any of Examples A17 through A19, wherein the one or more neural networks comprise one or more neural networks for levels, one network for providing values for feed-forward equalization filters, and one network for a time dispersion eye closure quaternary value.

Example B1 is a method to tune optical transceivers, comprising: connecting a transceiver to a test and measurement device; setting operating parameters for the transceiver to an average set of parameters; acquiring a waveform from the transceiver; measuring the waveform to determine if the transceiver passes or fails; sending the waveform and operating parameters to a machine learning system when the transceiver fails; using the machine learning system to provide adjusted operating parameters; setting the operating parameters to the adjusted parameters; and repeating the acquiring, sending, using, and setting until the transceiver passes.

Example B2 is the method of Example B1, further comprising setting a temperature for the transceiver.

Example B3 is the method of Example B2, further comprising repeating the method multiple times each for a different temperature.

Example B4 is the method of any of Examples B1 through B3, wherein providing adjusted operating parameters comprises: subtracting estimated parameters provided from the machine learning system from the operating parameters to find a difference; and adding the difference to the operating parameters to produce new operating parameters.

Example B5 is the method of any of Examples B1 through B4, further comprising completing testing of the transceiver if the transceiver passes.

Example B6 is the method of any of Examples B1 through B5, wherein repeating the acquiring and sending comprises: repeating the acquiring and sending until a predetermined number of times has been reached without the transceiver passing; and testing the transceiver using a different method.

Example B7 is the method of any of Examples B1 through B6, wherein the waveform is represented as an eye diagram consisting of single-level transitions.

Example B8 is of any of Examples B1 through B7, wherein measuring the waveform comprises measuring a transmitter dispersion eye closure quaternary (TDECQ) value.

Example B9 is a test and measurement device, comprising: a connection to allow the test and measurement device to connect to an optical transceiver; and one or more processors, configured to execute code that causes the one or more processors to: initially set operating parameters for the optical transceiver to average parameters; acquire a waveform from the optical transceiver; measure the acquired waveform and determine if operation of the transceiver passes or fails; send the waveform and the operating parameters to a machine learning system to obtain estimated parameters if the transceiver fails; adjust the operating parameters based upon the estimated parameters; and repeat the acquiring, measuring, sending, and adjusting as needed until the transceiver passes.

Example B10 is the device of Example B9, wherein the one or more processors are further configured to execute code to cause the one or more processors to set a temperature for the transceiver.

Example B11 is the device of Example B10, wherein the one or more processors are further configured to cause the one or more processors to repeat the execution of the code multiple times each for a different temperature.

Example B12 is the device of Example B10, wherein the code to cause the one or more processors to adjust the operating parameters comprises code to cause the one or more processors to subtract the estimated parameters from the operating parameters to find a difference, and add the difference to the average parameters to produce new operating parameters.

Example B13 is a method of training a machine learning system to determine operating parameters for optical transceivers, comprising: connecting the transceiver to a test and measurement device; tuning the transceiver with a set of parameters; capturing a waveform from the transceiver; sending the waveform and the set of parameters to a machine learning system; and repeating the tuning, capturing and sending until a sufficient number of samples are gathered.

Example B14 is the method of Example B13, further comprising: further comprising: setting a temperature for the transceiver; waiting until the temperature stabilizes; and recording the parameters.

Example B15 is the method of Example B14, further comprising adding the set of parameters to a histogram of parameters for the temperature.

Example B16 is the method of Example B14, further comprising adding the set of parameters to a histogram of parameters for the temperature.

Example B17 is the method of Example B14, further comprising repeating the setting, waiting and recording until a sufficient number of samples are gathered.

Example B18 is the method of any of Examples B13 through B17, wherein capturing the waveform further comprises generating an eye diagram overlay containing only single-level transitions.

Example B19 is the method of any of Examples B13 through B18, wherein the repeating occurs after changing the parameters to sweep a range for each parameter in the set of parameters.

Example C1 is test and measurement system, comprising: a test and measurement instrument; a test automation platform; and one or more processors, the one or more processors configured to execute code that causes the one or more processors to: receive a waveform created by operation of a device under test; generate one or more tensor arrays; apply machine learning to a first tensor array of the one or more tensor arrays to produce equalizer tap values; apply machine learning to a second tensor array of the one of the one or more tensor arrays to produce predicted tuning parameters for the device under test; use the equalizer tap values to produce a Transmitter and Dispersion Eye Closure Quaternary (TDECQ) value; and provide the TDECQ value and the predicted tuning parameters to the test automation platform.

Example C2 is the test and measurement system of Example C1, wherein the first tensor array comprises a plurality of tensor images, each tensor image in the tensor array having one waveform.

Example C3 is the test and measurement system of either of Examples C1 or C2, wherein the second tensor array comprises a plurality of tensor images, each tensor image in the tensor array having three or more waveforms.

Example C4 is the test and measurement system of any of Examples C1 through C3, wherein the code that causes the one or more processors to apply machine learning to the first tensor array and the code that causes the one or more processors to apply machine learning to the second tensor array operates within a same machine learning network.

Example C5 is the test and measurement system of any of Examples C1 through C4, wherein the code that causes the one or more processors to apply machine learning to the first tensor array and the code that causes the one or more processors to apply machine learning to the second tensor array operates in separate machine learning networks for each tensor array.

Example C6 is the test and measurement system of Examples C1 through C5, wherein the one or more processors are further configured to execute code to cause the one or more processors to train one or more machine learning networks, the code to cause the one or more processors to: receive a training waveform; use the training waveform to produce training equalizer tap values; generate one or more training tensor arrays from the training waveform; and provide the one or more training tensor arrays, the training equalizer taps, and tuning parameters associated with the training waveform to the one or more machine learning networks as a training data set.

Example C7 is the test and measurement system of Example C6, wherein the one or more machine learning networks comprises two machine learning networks, a first machine learning network trainable to produce the equalizer tap values and a second machine learning network trainable to produce the predicted tuning parameters.

Example C8 is the test and measurement system of Example C7, wherein the one or more processors are further configured to execute code to cause the one or more processors to train the first machine learning network, the code to cause the one or more processors to: receive a training waveform; use the training waveform to produce training equalizer tap values; generate one training tensor array from the training waveform, each tensor image in the training tensor array having one waveform; and provide the training tensor array, and the training equalizer taps to the first machine learning network as a training data set.

Example C9 is the test and measurement system of Example C7, wherein the one or more processors are further configured to execute code to cause the one or more processors to train the second machine learning network, the code to cause the one or more processors to: receive a training waveform; generate one training tensor array from the training waveform, each tensor image in the training tensor array having three or more waveforms; and provide the training tensor array and tuning parameters associated with the training waveform to the second machine learning network as a training data set.

Example C10 is the test and measurement system of any of Examples C1 through C9, wherein the one or more processors comprise one or more processors that reside in at least one of the test and measurement instrument and the test automation platform.

Example C11 is the test and measurement system of any of Examples C1 through C10, wherein the device under test comprises an optical transceiver or an optical transmitter.

Example C12 is the test and measurement system of Example C11, further comprising a probe comprising an optical fiber to receive an optical signal and an optical to electrical converter to generate an electrical signal from the optical signal, the electrical signal to be converted into the waveform.

Example C13 is a method of testing a device under test, comprising: receiving a waveform created by operation of a device under test; generating one or more tensor arrays; applying machine learning to a first tensor array of the one or more tensor arrays to produce equalizer tap values; applying machine learning to a second tensor array of the one or more tensor arrays to produce predicted tuning parameters for the device under test; using the equalizer tap values to produce a Transmitter Dispersion Eye Closure Quaternary (TDECQ) value; and providing the TDECQ value and the predicted tuning parameters to a test automation platform.

Example C14 is the method of Example C13, wherein the first tensor array comprises a plurality of tensor images, each tensor image in the tensor array having one waveform.

Example C15 is the method of either of Examples C13 or C14, wherein the second tensor array comprises a plurality of tensor images, each tensor image in the tensor array having three waveforms.

Example C16 is the method of any of Examples C13 through C15, wherein the applying machine to the first tensor array and applying machine learning to the second tensor array comprises applying machine learning by one machine learning network.

Example C17 is the method of any of Examples C13 through C15, wherein applying machine learning to the first tensor array comprises applying machine learning using a first machine learning network, and applying machine learning to the second tensor array comprises applying machine learning using a second machine learning network.

Example C18 is the method of any of Examples C13 through C17, further comprising training one or more machine learning networks, the training comprising: receiving a training waveform; using the training waveform to produce training equalizer tap values; generating one or more training tensor arrays from the training waveform; and providing the one or more training tensor arrays, the training equalizer tap values, and tuning parameters associated with the training waveform to the one or more machine learning networks as a training data set.

Example C19 is the method of Example C18, wherein training one or more machine networks comprises training a first machine learning network and a second machine learning network, the training comprising: using the training waveform to produce training equalizer tap values; generating a first training tensor array from the training waveform, each tensor image in the first training tensor array having one waveform image; generating a second training tensor array, each tensor image in the second training tensor array having three or more waveform images; providing the first training tensor array, and the training equalizer taps to the first machine learning network as a training data set; and providing the second training tensor arrays and tuning parameters associated with the training waveform to the second machine learning network as a training data set.

Example C20 is the method of any of Examples C13 through C19, wherein receiving a waveform signal resulting from operation of a DUT comprises receiving an optical signal from the DUT and converting the optical signal into an electrical signal to be converted to the waveform.

Example D1 is a test and measurement instrument, comprising: an input configured to receive a signal from a device under test; a memory; a user interface to allow the user to input settings for the test and measurement instrument; and one or more processors, the one or more processors configured to execute code that causes the one or more processors to: acquire a waveform representing the signal received from the device under test; generate one or more tensor arrays based on the waveform; apply machine learning to the one or more tensor arrays to produce equalizer tap values; and apply equalization to the waveform using the equalizer tap values to produce an equalized waveform; and perform a measurement on the equalized waveform to produce a value related to a performance requirement for the device under test.

Example D2 is the test and measurement instrument of Example D1, wherein the one or more processors are further configured to execute code to determine whether the value indicates that the device under test meets the performance requirement.

Example D3 is the test and measurement instrument of either of Examples D1 or D2, wherein the code that causes the one more processors to apply machine learning comprises code to cause the one or more processors to send the tensor arrays to a machine learning network on a device separate from the test and measurement instrument.

Example D4 is the test and measurement instrument of any of Examples D1 through D3, wherein the code to cause the one or more processors to apply machine learning to the one or more tensor arrays to produce equalizer tap values comprises code to cause the one or more processors to produce feed-forward equalizer tap values for a feed-forward equalizer (FFE).

Example D5 is the test and measurement instrument of any of Examples D1 through D4, wherein the code to cause the one or more processors to perform a measurement on the equalized waveform comprises code to cause the one or more processors to perform a transmitter and dispersion eye closure quaternary (TDECQ) measurement on the equalized waveform to produce the value.

Example D6 is the test and measurement instrument of any of Examples D1 through D5, wherein the one or more processors are further configured to execute code to cause the one or more processors to train a machine learning network, the code to cause the one or more processors to: receive a training waveform; use the training waveform to produce training equalizer tap values; generate one or more training tensor arrays from the training waveform; and provide the one or more training tensor arrays and the training equalizer tap values to the machine learning network as a training data set.

Example D7 is the test and measurement instrument of Example D6, wherein the code to cause the one or more processors to produce training equalizer tap values comprises code to produce training equalizer tap values for a feed-forward equalizer.

Example D8 is the test and measurement instrument of any of Examples D1 through D7, further comprising a probe, wherein the device under test is coupled to the input by the probe.

Example D9 is the test and measurement instrument of Example D8, wherein the probe comprises an optical fiber.

Example D10 is the test and measurement instrument of any of Examples D1 through D9, wherein the probe comprises an optical to electrical converter.

Example D11 is the test and measurement instrument of Examples D8 through D10, wherein the probe is configured to connect to a device operating under IEEE standard 802.3.

Example D12 is a method of testing a device under test, comprising: acquiring a waveform representing a signal received from the device under test; generating one or more tensor arrays based on the waveform; applying machine learning to the one or more tensor arrays to produce equalizer tap values; applying the equalizer tap values to the waveform to produce an equalized waveform; and performing a measurement on the equalized waveform to produce a value related to a performance requirement for the device under test.

Example D13 is the method of Example D12, further comprising determining whether the value indicates that the device under test meets the performance requirement.

Example D14 is the method of either Examples D12 and D13, wherein applying machine learning to the one or more tensor array to produce equalizer tap values comprises applying machine learning to the one or more tensor arrays to produce feed-forward equalizer tap values.

Example D15 is the method of Example D14, wherein the feed-forward equalizer tap values are for a 5-tap feed forward equalizer.

Example D16 is the method of any of Examples D12 through D15, wherein performing a measurement on the equalized waveform comprises measuring the transmitter and dispersion eye closure quaternary (TDECQ) of the equalized waveform.

Example D17 is the method of any of Examples D12 through D16, further comprising training a machine learning network, the training comprising: receiving a training waveform; using the training waveform to produce training equalizer tap values; and generating one or more training tensor arrays from the training waveform; and providing the one or more training tensor arrays and the training equalizer tap values to the machine learning network as a training data set.

Example D18 is the method of Example D17, wherein using the training waveform to produce training equalizer tap values comprises using the training waveform to produce training equalizer tap values for a feed-forward equalizer.

Example D19 is the method of any of Examples D12 through D18, wherein acquiring the waveform representing the signal received from the device under test comprises receiving an optical signal through a test fiber, the optical signal created by operation of the device under test.

Example D20 is the method of Example of D19, further comprising converting the optical signal to an electrical signal.

Example E1 is a test system, comprising: ovens, each oven configured to hold a number of devices under test (DUTs); DUT switches, each switch connected to each of the DUTs in a respective oven; splitters, each splitter connected to a respective DUT switch, each splitter having two outputs; an instrument switch connected to one output of each splitter, the other output of each splitter connected to a channel of a test instrument; and one or more processors configured to execute code that causes the one or more processors to: control the instrument switch to select one of the DUT switches connected to an oven; control the selected DUT switch to serially connect each DUT in the oven to a same channel of the test and measurement instrument; as each DUT is connected, use machine learning to tune the DUT to a set of parameters until the DUT passes or fails operational testing; repeat the connecting, tuning, and testing of each DUT until all DUTs in an oven have been tested; and repeat the selection and control of the DUT switches until each DUT in each oven has been tuned and tested.

Example E2 is the test system of Example E1, wherein a number of DUT switches corresponds to a number of ovens.

Example E3 is the test system of either of Examples E1 or E2, wherein the instrument switch has a dimension corresponding to the number of DUT switches.

Example E4 is the test system of any of Examples E1 through E3, wherein the code that causes the one or more processors to control the instrument switch to select one of the DUT switches comprises code to control the instrument switch to select one of the DUT switches and connect each selected DUT switch to a dedicated channel of the test instrument.

Example E5 is the test system of any of Examples E1 through E4, wherein the one or more processors are further configured to control the ovens to cause the ovens to cycle through multiple temperatures, and the one or more processors repeat the control of the instrument switch and the DUT switches for each temperature.

Example E6 is the test system of any of Examples E1 through E5, wherein the one or more processors are further configured to control a robot to unload and reload the ovens with DUTs.

Example E7 is the test control system of any of Examples E1 through E6, wherein the DUTs comprise one of either electronic devices or optical devices.

Example E8 is the test control system of any of Examples E1 through E7, wherein the code that causes the one or more processors to use machine learning comprises code to cause the one or more processors to: receive waveforms from the DUT through the instrument; and apply machine learning to analyze the waveform and provide tuning parameters to the DUT.

Example E9 is a method of testing devices under test, comprising: performing a testing process comprising: setting a selected oven from a plurality of ovens containing a set of devices under test (DUT) to a first temperature; connecting a selected DUT switch connected to the DUTs in the selected oven to a selected channel of an instrument; controlling the DUT switch to serially connect each DUT in the selected oven to tune and test each DUT in the selected oven using a machine learning system; and repeating the connecting and controlling as needed for subsequent temperatures; and repeating the testing process for each of the plurality of ovens, such that each subsequent oven in the process is set to the first temperature after a previous oven starts heating up to the first temperature.

Example E10 is the method of Example E9, wherein connecting the selected DUT switch to the selected channel of the instrument comprises employing an instrument switch connected between the instrument and a plurality of DUT switches, each DUT switch corresponding to one of the plurality of ovens.

Example E11 is the method of Example E10, further comprising splitting a signal from the selected DUT switch between the selected channel of the instrument and a clock input on the instrument and recovering a clock signal for the instrument from the split signal.

Example E12 is the method of any of Examples E9 through E11, wherein connecting the selected DUT switch to the selected channel of the instrument comprises connecting a DUT switch for each oven to a different channel of the instrument.

Example E13 is the method of any of Examples E9 through E12, further comprising: instructing an operator or a machine to remove the DUTs from each oven after the oven has cycled through any subsequent temperatures; and instructing the operator or the machine to load a new set of DUTs into the oven.

Example E14 is the method of any of Examples E9 through E13, wherein the DUTs comprise one of either optical devices or electronic devices.

Example E15 is the method of any of Examples E9 through E14, wherein using the machine learning system comprises: receiving waveforms from each DUT; and applying machine learning to the waveforms to produce tuning parameters for the DUT.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although specific embodiments have been illustrated and described for purposes of illustration, it will be understood that various modifications may be made without departing from the spirit and scope of the disclosure. Accordingly, the invention should not be limited except as by the appended claims.

We claim:

1. A test and measurement system, comprising:

a test and measurement instrument, including a port to receive a signal from a device under test (DUT); and one or more processors, configured to execute code that causes the one or more processors to:

adjust a set of operating parameters for the DUT to a first set of reference parameters;

acquire, using the test and measurement instrument, a waveform from the DUT; repeatedly execute the code to cause the one or more processors to adjust the set of operating parameters and acquire a waveform, for each of a predetermined number of sets of reference parameters;

build one or more tensors from the acquired waveforms;

send the one or more tensors to a machine learning system to obtain a set of predicted optimal operating parameters;

adjust the set of operating parameters for the DUT to the set of predicted optimal operating parameters; and determine whether the DUT passes a predetermined performance measurement when adjusted to the set of predicted optimal operating parameters.

2. The test and measurement system as claimed in claim 1, wherein the one or more processors are further configured to execute code to cause the one or more processors to repeat the execution of the code for each temperature setting in a range of temperatures settings.

3. The test and measurement system as claimed in claim 1, wherein the one or more processors are distributed among the test and measurement instrument, a test automation system and a machine learning system separate from the test and measurement instrument.

4. The test and measurement system as claimed in claim 1, wherein the machine learning system comprises a plurality of neural networks, one or more to produce the set of predicted optimal operating parameters, one to produce a predicted measurement value, and one to produce a set of optimized feed-forward equalization filter tap values.

5. The test and measurement system as claimed in claim 1, wherein the predetermined number of sets of reference parameters is three, one set of average values for the parameters, one set having values higher than the average values, and one set having values lower than the average values.

6. The test and measurement system as claimed in claim 1, wherein the one or more processors are further configured to execute code to cause the one or more processors to apply an inverse normalization to the predicted operating parameters.

7. The test and measurement system as claimed in claim 1, wherein the test and measurement instrument is an oscilloscope.

8. A method to determine optimal operating parameters for a device under test (DUT), the method comprising:

connecting the DUT to a test and measurement instrument;

adjusting a set of operating parameters for the DUT to a first set of reference parameters;

acquiring, using the test and measurement instrument, a waveform from the DUT;

repeating the adjusting the set of operating parameters and acquiring a waveform, for each of a predetermined number of sets of reference parameters;

building one or more tensors from the acquired waveforms;

sending the one or more tensors to a machine learning system to obtain a set of predicted optimal operating parameters;

adjusting the set of operating parameters for the DUT to the set of predicted optimal operating parameters; and determining whether the DUT passes a predetermined performance measurement when adjusted to the set of predicted optimal operating parameters.

9. The method as claimed in claim 8, further comprising repeating the method for each temperature in a range of temperatures.

10. The method as claimed in claim 8, wherein building one or more tensors comprises building a levels tensor, an impulse tensor, and a combined tensor.

11. The method as claimed in claim 8, wherein building a combined tensor comprises building an image having three or more channels.

12. The method as claimed in claim 11, wherein the image includes a bar graph image representing at least one of a temperature value and a noise value.

13. The method as claimed in claim 8, further comprising generating reference operating parameters, comprising:

tuning a plurality of optical transceivers at a plurality of temperatures;

generating a histogram of each tuning parameter, at each temperature, for the plurality of tuned optical transceivers;

calculating a mean reference parameter set by averaging values for each parameter in the histograms;

increasing values in the mean parameter set to create a first delta reference parameter set; and decreasing values in the mean parameter set to create a second delta reference parameter set.

14. The method as claimed in claim 8, wherein building one or more tensors comprises building a tensor having three channels, one channel for a mean reference tensor, one channel for a first delta tensor, and one channel for a second delta tensor.

15. The method as claimed in claim 8, wherein sending the one or more tensors to a machine learning system comprises:

sending the one or more tensors to two neural networks in the machine learning system to obtain optimized operating parameters;

sending an impulse tensor to a third neural network to obtain optimized feed-forward equalization filter taps; and sending a combined tensor to a fourth neural network to obtain a predicted transmitter and dispersion eye closure penalty quaternary (TDECQ) measurement.

16. The method as claimed in claim 8, wherein determining whether the DUT passes a predetermined performance measurement comprises measuring an output of the DUT and determining if the output is within a predetermined range.

17. The method as claimed in claim 8, further comprising applying an inverse normalization to the set of predicted optimal operating parameters.

* * * * *